(12) United States Patent
Hall et al.

(10) Patent No.: US 9,202,178 B2
(45) Date of Patent: Dec. 1, 2015

(54) COMPUTERIZED CLUSTER ANALYSIS FRAMEWORK FOR DECORRELATED CLUSTER IDENTIFICATION IN DATASETS

(71) Applicant: SAS Institute Inc., Cary, NC (US)

(72) Inventors: Patrick Hall, Durham, NC (US); Ilknur Kaynar Kabul, Apex, NC (US); Jared Langford Dean, Cary, NC (US); Ralph Abbey, Raleigh, NC (US); Susan Haller, Raleigh, NC (US); Jorge Silva, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/558,136

(22) Filed: Dec. 2, 2014

(65) Prior Publication Data

US 2015/0261846 A1  Sep. 17, 2015

Related U.S. Application Data

(60) Provisional application No. 61/951,262, filed on Mar. 11, 2014, provisional application No. 61/988,980, filed on May 6, 2014.

(51) Int. Cl.
| | |
|---|---|
| *G06F 15/18* | (2006.01) |
| *G06N 99/00* | (2010.01) |
| *G06F 17/30* | (2006.01) |
| *G06K 9/62* | (2006.01) |

(52) U.S. Cl.
CPC ........ *G06N 99/005* (2013.01); *G06F 17/30598* (2013.01); *G06K 9/6256* (2013.01)

(58) Field of Classification Search
None
See application file for complete search history.

(56) References Cited

U.S. PATENT DOCUMENTS

| | | | |
|---|---|---|---|
| 5,325,447 | A | 6/1994 | Vogt, III |
| 5,764,824 | A | 6/1998 | Kurtzberg et al. |

(Continued)

FOREIGN PATENT DOCUMENTS

| | | |
|---|---|---|
| CN | 101149842 | 7/2012 |
| WO | WO 9714958 | 4/1997 |

(Continued)

OTHER PUBLICATIONS

T. Kohonen, Optimal Associative Mappings, Chapter 6 of Self-Organization and Associative Memory, Springer-Verlag, Berlin, 1984, pp. 158-184.

(Continued)

*Primary Examiner* — Kakali Chaki
*Assistant Examiner* — Luis Sitiriche
(74) *Attorney, Agent, or Firm* — Bell & Manning, LLC

(57) ABSTRACT

A computing device to automatically cluster a dataset is provided. Data that includes a plurality of observations with a plurality of data points defined for each observation is received. Each data point of the plurality of data points is associated with a variable to define a plurality of variables. A number of clusters into which to segment the received data is repeatedly selected by repeatedly executing a clustering algorithm with the received data. A plurality of sets of clusters is defined based on the repeated execution of the clustering algorithm that resulted in the selected number of clusters. A plurality of composite clusters is defined based on the defined plurality of sets of clusters. The plurality of observations is assigned to the defined plurality of composite clusters using the plurality of data points defined for each observation.

30 Claims, 23 Drawing Sheets

(56) References Cited

U.S. PATENT DOCUMENTS

| | | | |
|---|---|---|---|
| 6,012,058 A | 1/2000 | Fayyad et al. | |
| 6,026,397 A | 2/2000 | Sheppard | |
| 6,304,675 B1 | 10/2001 | Osbourn et al. | |
| 6,380,937 B1 | 4/2002 | Dong et al. | |
| 6,421,665 B1* | 7/2002 | Brye et al. | 707/999.002 |
| 6,728,724 B1 | 4/2004 | Megiddo et al. | |
| 6,816,848 B1 | 11/2004 | Hildreth et al. | |
| 7,003,509 B2 | 2/2006 | Andreev | |
| 7,398,270 B1* | 7/2008 | Choi et al. | 706/48 |
| 7,809,824 B2 | 10/2010 | Wei et al. | |
| 8,019,698 B1 | 9/2011 | Dryer et al. | |
| 8,190,612 B2* | 5/2012 | Lee et al. | 707/737 |
| 8,229,876 B2 | 7/2012 | Roychowdhury | |
| 8,335,698 B2 | 12/2012 | Angell et al. | |
| 8,402,026 B2 | 3/2013 | Gallivan | |
| 8,489,531 B2 | 7/2013 | Ben Hur et al. | |
| 8,606,787 B1 | 12/2013 | Asgekar et al. | |
| 8,713,021 B2 | 4/2014 | Bellegarda | |
| 2002/0091655 A1* | 7/2002 | Agrafiotis et al. | 706/26 |
| 2006/0048026 A1 | 3/2006 | Fine et al. | |
| 2006/0093222 A1* | 5/2006 | Saffer et al. | 715/968 |
| 2007/0087756 A1* | 4/2007 | Hoffberg | 455/450 |
| 2008/0046808 A1 | 2/2008 | Malkin et al. | |
| 2008/0069458 A1 | 3/2008 | Vega-Higuera et al. | |
| 2009/0164171 A1* | 6/2009 | Wold et al. | 706/46 |
| 2013/0042172 A1 | 2/2013 | Mansfield et al. | |
| 2013/0297607 A1 | 11/2013 | Ben-Hur et al. | |
| 2014/0012848 A1 | 1/2014 | Denney et al. | |
| 2015/0019554 A1 | 1/2015 | Hall et al. | |

FOREIGN PATENT DOCUMENTS

| | | |
|---|---|---|
| WO | WO 0016250 | 3/2000 |
| WO | WO 0120536 A2 | 3/2001 |
| WO | WO 0120536 A3 | 3/2001 |
| WO | WO 2012119206 | 9/2012 |
| WO | WO 2013126281 | 8/2013 |

OTHER PUBLICATIONS

T. Kohonen, Pattern Recognition, Chapter 7 of Self-Organization and Associative Memory, Springer-Verlag, Berlin, 1984, pp. 185-209.

Linoff et al., Chapter 4 Statistics 101: What You Should Know About Data, Data Mining Techniques: For Marketing, Sales, and Customer Relationship Management, Third Edition, Wiley & Sons, 2011, pp. 101-149.

Linoff et al., Chapter 9 Nearest Neighbor Approaches: Memory-Based Reasoning and Collaborative Filtering, Data Mining Techniques: For Marketing, Sales, and Customer Relationship Management, Third Edition, Wiley & Sons, 2011, pp. 321-355.

Linoff et al., Chapter 13 Finding Islands of Similarity: Automatic Cluster Detection, Data Mining Techniques: For Marketing, Sales, and Customer Relationship Management, Third Edition, Wiley & Sons, 2011, pp. 459-498.

Linoff et al., Chapter 14 Alternative Approaches to Cluster Detection, Data Mining Techniques: For Marketing, Sales, and Customer Relationship Management, Third Edition, Wiley & Sons, 2011, pp. 499-533.

Y. Versley, Decorrelation and Shallow Semantic Patterns for Distributional Clustering of Nouns and Verbs, May 16, 2014.

Claim Prediction Challenge (Allstate), http://www.kaggle.com/c/ClaimPredictionChallenge, Jul. 13, 2011.

TwoStep Cluster Analysis, Available from http://www-01.ibm.com/support/knowledgecenter/SSLVMB_20.0.0/com.ibm.spss.statistics.help/idh_twostep_main.htm on May 30, 2014.

R. Kabacoff, Quick-R accessing the power of R, Available from http://www.statmethods.net/advstats/cluster.html on May 30, 2014.

Maechler, Cluster Analysis Extended, Package 'cluster', version 1.15.3, Sep. 4, 2014, pp. 1-79.

Leisch et al., Cran Task View: Cluster Analysis & Finite Mixture Models, Available from http://cran.r-project.org/web/views/Cluster.html on May 30, 2014.

Hierarchical Cluster Analysis, Available from http://www.r-tutor.com/gpu-computing/clustering/hierarchical-cluster-analysis on May 30, 2014.

J. Oksanen, Cluster Analysis: Tutorial with R, Jan. 26, 2014, pp. 1-13.

kmeans, Available from http://www.mathworks.com/help/stats/kmeans.html on May 30, 2014.

Lab 13—Cluster Analysis, Available from http://ecology.msu.montana.edu/labdsv/R/labs/lab13/lab13.html on May 30, 2014.

Fuzzy Clustering, Available from http://www.mathworks.com/help/fuzzy/fuzzy-clustering.html on May 30, 2014.

Color-Based Segmentation Using K-Means Clustering, Available from http://www.mathworks.com/help/images/examples/color-based-segmentation-using-k-means-clustering.html on May 30, 2014.

Linoff et al., Chapter 16 Link Analysis, Data Mining Techniques: For Marketing, Sales, and Customer Relationship Management, Third Edition, Wiley & Sons, 2011, pp. 581-612.

Hageman et al., Bagged K-Means Clustering of Metabolome Data, Critical Reviews in Analytical Chemistry, vol. 36, 2006, pp. 211-220.

Li et al., K-Means Clustering with Bagging and MapReduce, Proceedings of the 44th Hawaii International Conference on System Sciences, 2011, pp. 1-8.

Strehl et al., Cluster Ensembles—A Knowledge Reuse Framework for Combining Multiple Partitions, Journal of Machine Learning Research, vol. 3, Dec. 2002, pp. 583-617.

Hinton et al., Reducing the Dimensionality of Data with Neural Networks, Science, vol. 313, Jul. 28, 2006, pp. 504-507.

B.W. Silverman, Using Kernel Density Estimates to investigate Multimodality, J.R. Statist. Soc. B, vol. 43, No. 1, 1981, pp. 97-99.

M. C. Minnotte, Mode testing via higher-order density estimation, Comput Stat, vol. 25, Feb. 11, 2010, pp. 391-407.

W.S. Sarle, SAS Institute Inc., SAS® Technical Report A-108, Cubic Clustering Criterion, Cary, NC: SAS Institute Inc., 1983.

P.J. Rousseeuw, Silhouettes: a graphical aid to the interpretation and validation of cluster analysis, Journal of Computational and Applied Mathematics, vol. 20, 1987, pp. 53-65.

The SPSS TwoStep Cluster Component, SPSS, 2001, pp. 1-9.

McCullagh et al., How many clusters?, Bayesian Analysis, vol. 3, No. 1, 2008, pp. 101-120.

Tibshirani et al., Estimating the number of Clusters in a Data Set via the Gap Statistic, Journal of the Royal Statistical Society. Series B (Statistical Methodology), vol. 63, No. 2, 2001, pp. 411-423.

A.D. Gordon, Chapter 4 Hierarchical classifications, Classification, 2nd Edition, Chapman and Hall-CRC, 1999, pp. 69-109.

A.D. Gordon, Chapter 5 Other clustering procedures, Classification, 2nd Edition, Chapman and Hall-CRC, 1999, pp. 111-146.

A.D. Gordon, Chapter 7 Cluster validation and description, Classification, 2nd Edition, Chapman and Hall-CRC, 1999, pp. 183-211.

Hall et al., An Overview of Machine Learning with SAS® Enterprise Miner™, SAS/STAT Software Paper SAS313-2014., Mar. 25, 2009, Cary, NC: SAS Institute Inc. pp. 1-24.

Giarratano et al., Chapter 12 Expert System Design Examples, Expert Systems, Third Edition, Boston, PWS Publishing Company, 1998, pp. 513-526.

Agrawal et al., Mining Association Rules between Sets of Items in Large Databases, ACM SIGMOD, 1993, pp. 207-216.

Belkin et al., Manifold Regularization: A Geometric Framework for Learning from Labeled and Unlabeled Examples, Journal of Machine Learning Research, vol. 7, Nov. 2006, pp. 2399-2434.

L. Breiman, Random Forests, Machine Learning, vol. 45, 2001, pp. 5-32.

L. Breiman, Statistical Modeling: The Two Cultures, Statistical Science, vol. 16, No. 3, 2001, pp. 199-215.

Breiman et al., Chapter 4 Splitting Rules, Classification and Regression Trees, Wadsworth International Group, Belmont, CA, 1984, pp. 93-129.

Breiman et al., Chapter 8 Regression Trees, Classification and Regression Trees, Wadsworth International Group, Belmont, CA, 1984, pp. 216-265.

Breiman et al., Chapter 10 Optimal Pruning, Classification and Regression Trees, Wadsworth International Group, Belmont, CA, 1984, pp. 279-296.

(56) References Cited

OTHER PUBLICATIONS

Y. Cheng, Mean Shift, Mode Seeking, and Clustering, IEEE Transactions on Pattern Analysis and Machine Intelligence, vol. 17, No. 8, Aug. 1995, pp. 790-799.
Cortes et al., Support-Vector Networks, Machine Learning, vol. 20, 1995, pp. 273-297.
Cover et al., Nearest Neighbor Pattern Classification, IEEE Transactionsons on Information Theory, vol. IT-13, No. 1, Jan. 1967, pp. 21-27.
de Ville et al., Chapter 3 The Mechanics of Decision Tree Construction , Decision Trees for Analytics Using SAS® Enterprise Miner™, Jun. 2013, pp. 55-115.
de Ville et al., Chapter 6 The Integration of Decision Trees with Other Data Mining Approaches , Decision Trees for Analytics Using SAS® Enterprise Miner™, Jun. 2013, pp. 187-217.
J.H. Friedman, Greedy Function Approximation: A Gradient Boosting Machine, The Annals of Statistics,.vol. 29, No. 5 , Oct. 2001, pp. 1189-1232.
Friedman et al., Bayesian Network Classifiers, Machine Learning, vol. 29, 1997, pp. 131-163.
Golub et al., Singular Value Decomposition and Least Squares Solutions, Numer. Math., vol. 14, 1970, pp. 403-420.
Hartigan et al., Algorithm AS 136: A K-Means Clustering Algorithm, Journal of the Royal Statistical Society. Series C (Applied Statistics), vol. 28, No. 1, 1979, pp. 100-108.
Hunt et al., Chapter 3 Concept Learning System 1. Basic Results, Experiments in Induction, Academic Press, New York, 1966, pp. 45-69.
T. Joachims, Transductive Inference for Text Classification using Support Vector Machines, Machine Learning Proceedings of the Sixteenth International Conference, 1999, pp. 200-209.
Lee et al., Learning the parts of objects by non-negative matrix factorization, Nature, vol. 401, Oct. 21, 1999, pp. 788-791.
J. Lighthill, Artificial Intelligence: a paper symposium, Swindon, UK: Science Research Council, 1973.
McCulloch et al., A Logical Calculus of the Ideas Immanent in Nervous Activity , Bulletin of Mathematical Biophysics, vol. 5, 1943, pp. 115-133.
Minsky et al., Geometric Theory of Linear Inequalities, Perceptrons: An Introduction to Computational Geometry, The Massachusetts Institute of Technology, 1969, pp. 69-72.
Minsky et al., A Geometric Property with Unbounded Order, Perceptrons: An Introduction to Computational Geometry, The Massachusetts Institute of Technology, 1969, pp. 73-95.
Le et al., On Optimization Methods for Deep Learning, Proceedings of the 28th International Conference on Machine Learning, 2011.
Nigam et al., Text Classification from Labeled and Unlabeled Documents using EM, Machine Learning, vol. 39, 2000, pp. 103-134.
M. Panik, Chapter 2 Bivariate Linear Regression and Correlation , Regression Modeling: Methods, Theory, and Computation with SAS, CRC Press, Boca Raton, FL, 2009, pp. 23-105.
M. Panik, Chapter 7 Robust Regression , Regression Modeling: Methods, Theory, and Computation with SAS, CRC Press, Boca Raton, FL, 2009, pp. 291-299.
M. Panik, Chapter 9 Random Coefficients Regression, Regression Modeling: Methods, Theory, and Computation with SAS, CRC Press, Boca Raton, FL, 2009, pp. 369-376.
F. Rosenblatt, The Perceptron: A Probabilistic Model for Information Storage and Organization in the Brain, Psychological Review, vol. 65, No. 6, 1958, pp. 386-408.
Rumelhart et al., Learning representations by back-propagating errors, Nature, vol. 323, Oct. 9, 1986, pp. 533-536.
Schölkopf et al., Kernel Principal Component Analysis, In Artificial Neural Networks, Berlin, 1997, pp. 583-588.
F. Sebastiani , Machine Learning in Automated Text Categorization, ACM Computing Surveys, vol. 34, No. 1, Mar. 2002, pp. 1-47.
M. Seeger, Gaussian Processes for Machine Learning, International Journal of Neural Systems, vol. 14, No. 2, 2004, pp. 69-106.
B.W. Silverman, Chapter 5 Three important methods, Density Estimation for Statistics and Data Analysis, Chapman and Hall, London, GB, 1986, pp. 95-100.
B.W. Silverman, Chapter 6 Density estimation in action, Density Estimation for Statistics and Data Analysis, Chapman and Hall, London, GB, 1986, pp. 130-137.
Vincent et al., Extracting and Composing Robust Features with Denoising Autoencoders, Proceedings of the 25th International Conference on Machine Learning, Helsinki, Finland, 2008, pp. 1096-1103.
U. von Luxburg, A tutorial on spectral clustering, Stat Comput, vol. 17, 2007, pp. 395-416.
R. Davis, Knowledge Acquisition in Rule-Based Systems—Knowledge About Representations as a Basis for System Construction and Maintenance , Pattern-Directed Inference Systems, Waterman et al., New York, Academic Press, 1978, pp. 99-134.
F. Hayes-Roth, The Role of Partial and Best Matches in Knowledge Systems , Pattern-Directed Inference Systems, Waterman et al., New York, Academic Press, 1978, pp. 557-577.
Zou et al., Sparse Principal Component Analysis, Journal of Computational and Graphical Statistics, vol. 15, No. 2, Jun. 2006, pp. 265-286.
k-means clustering, Available from http://en.wikipedia.org/wiki/K-means_clustering on May 30, 2014.
Hariharan et al., Discriminative Decorrelation for Clustering and Classification, European Conference on Computer Vision, 2012, pp. 1-14.
Orme et al., Improving K-Means Cluster Analysis: Ensemble Analysis Instead of Highest Reproducibility Replicates, Copyright Sawtooth Software, 2008, pp. 1-11.
Goswami et al., Evolutionary Monte Carlo Methods for Clustering, Journal of Computational and Graphical Statistics, vol. 16, No. 4, 2007, pp. 1-22.
Chapter 6 The HPCLUS Procedure, SAS® Enterprise MinerTM 13.1: High-Performance Procedures. Cary, NC: SAS Institute Inc., 2013, pp. 78-102.
Yang et al., How many clusters?, Bayesian Analysis, vol. 3, No. 1, 2008, pp. 101-120.

\* cited by examiner

COMPUTERIZED CLUSTER ANALYSIS FRAMEWORK FOR DECORRELATED CLUSTER IDENTIFICATION IN DATASETS

CROSS-REFERENCE TO RELATED APPLICATIONS

The present application claims the benefit of 35 U.S.C. §119(e) to U.S. Provisional Patent Application No. 61/951,262 filed on Mar. 11, 2014, and to U.S. Provisional Patent Application No. 61/988,980 filed on May 6, 2014, the entire contents of which are hereby incorporated by reference.

BACKGROUND

Given a data matrix X of size n by p, clustering assigns the observations (rows of X) to clusters, or groups based on some or all of the data variables (columns of X). Clustering is a cornerstone of business intelligence, with wide-ranging applications such as market segmentation and fraud detection. Machine learning is a branch of artificial intelligence that is concerned with building systems that require minimal human intervention in order to learn from data.

SUMMARY

In an example embodiment, a method of automatically clustering a dataset is provided. Data that includes a plurality of observations with a plurality of data points defined for each observation is received. Each data point of the plurality of data points is associated with a variable to define a plurality of variables. A number of clusters into which to segment the received data is repeatedly selected by repeatedly executing a clustering algorithm with the received data. A plurality of sets of clusters is defined based on the repeated execution of the clustering algorithm that resulted in the selected number of clusters. A plurality of composite clusters is defined based on the defined plurality of sets of clusters. The plurality of observations is assigned to the defined plurality of composite clusters using the plurality of data points defined for each observation.

In another example embodiment, a computer-readable medium is provided having stored thereon computer-readable instructions that, when executed by a computing device, cause the computing device to perform the method of automatically clustering a dataset.

In yet another example embodiment, a computing device is provided. The system includes, but is not limited to, a processor and a computer-readable medium operably coupled to the processor. The computer-readable medium has instructions stored thereon that, when executed by the computing device, cause the computing device to perform the method of automatically clustering a dataset.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
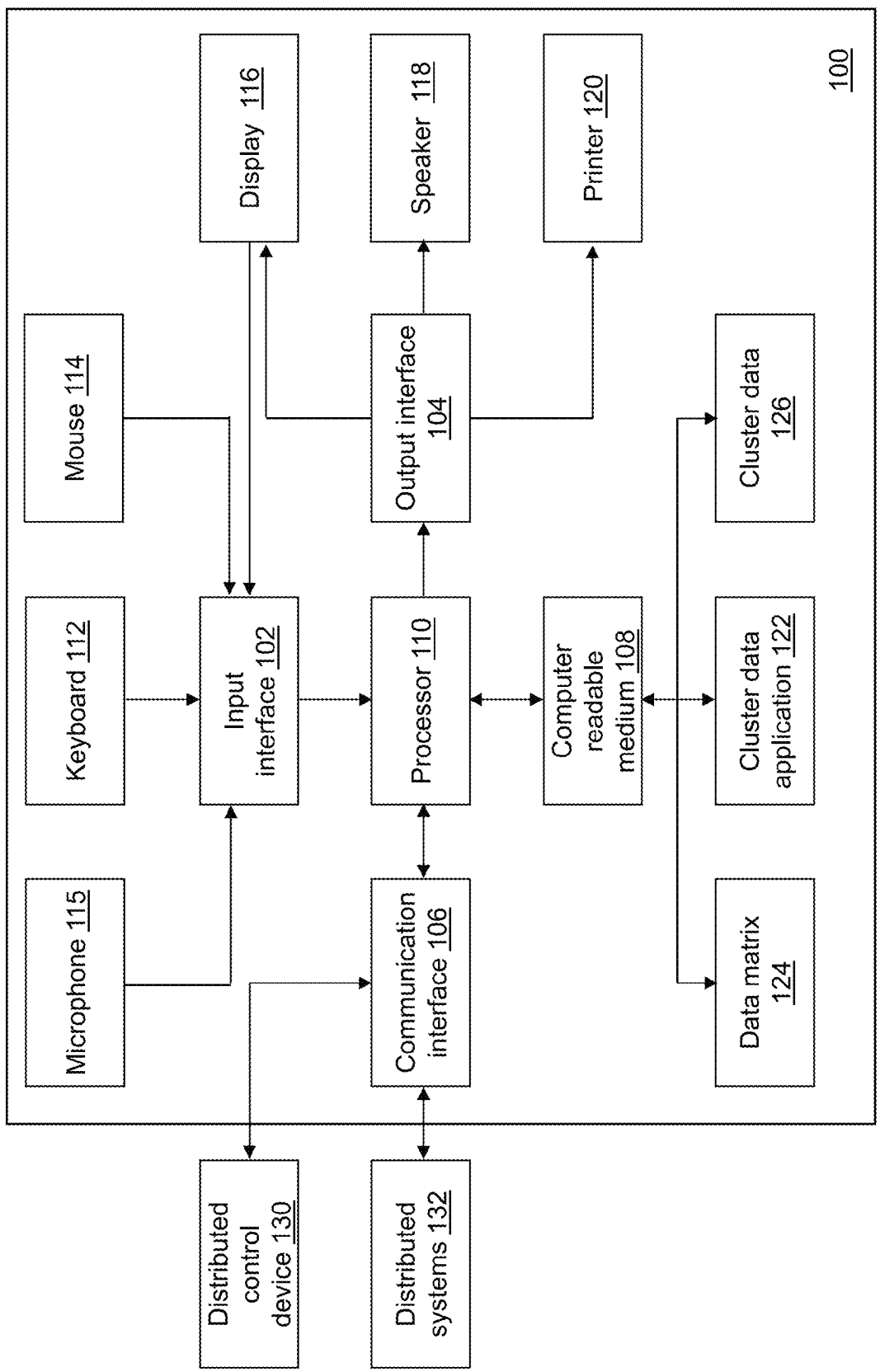
FIG. 1 depicts a block diagram of a data transformation device in accordance with an illustrative embodiment.

Referring to FIG. 1, a block diagram of a data transformation device 100 is shown in accordance with an illustrative embodiment. Data transformation device 100 may include an input interface 102, an output interface 104, a communication interface 106, a non-transitory computer-readable medium 108, a processor 110, a cluster data application 122, a data matrix 124, and cluster data 126. Fewer, different, and/or additional components may be incorporated into data transformation device 100.

Input interface 102 provides an interface for receiving information from the user for entry into data transformation device 100 as understood by those skilled in the art. Input interface 102 may interface with various input technologies including, but not limited to, a keyboard 112, a mouse 114, a microphone 115, a display 116, a track ball, a keypad, one or more buttons, etc. to allow the user to enter information into data transformation device 100 or to make selections presented in a user interface displayed on the display. The same interface may support both input interface 102 and output interface 104. For example, display 116 comprising a touch screen provides user input and presents output to the user. Data transformation device 100 may have one or more input interfaces that use the same or a different input interface technology. The input interface technology further may be accessible by data transformation device 100 through communication interface 106.

Output interface 104 provides an interface for outputting information for review by a user of data transformation device 100. For example, output interface 104 may interface with various output technologies including, but not limited to, display 116, a speaker 118, a printer 120, etc. Data transformation device 100 may have one or more output interfaces that use the same or a different output interface technology. The output interface technology further may be accessible by data transformation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data transformation device 100 may have one or more communication interfaces that use the same or a different communication interface technology. For example, data transformation device 100 may support communication using an Ethernet port, a Bluetooth antenna, a telephone jack, a USB port, etc. Data and messages may be transferred between data transformation device 100 and/or a distributed control device 130 and/or distributed systems 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data transformation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data transformation device 100 also may have one or more drives that support the loading of a memory media such as a CD, DVD, an external hard drive, etc. One or more external hard drives further may be connected to data transformation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data transformation device 100 may include a plurality of processors that use the same or a different processing technology.

Cluster data application 122 performs operations associated with creating cluster data 126 from data stored in data matrix 124. Cluster data application 122 can automatically select relevant variables from data stored in data matrix 124, determine a best number of clusters into which to segment the data stored in data matrix 124, define composite clusters, assign observations to the defined composite clusters, and present a visualization of the defined composite clusters. The created cluster data 126 may be used to perform various data mining functions and to support various data analysis functions as understood by a person of skill in the art. Some or all of the operations described herein may be embodied in cluster data application 122. The operations may be implemented using hardware, firmware, software, or any combination of these methods. Referring to the example embodiment of FIG. 1, cluster data application 122 is implemented in software (comprised of computer-readable and/or computer-executable instructions) stored in computer-readable medium 108 and accessible by processor 110 for execution of the instructions that embody the operations of cluster data application 122. Cluster data application 122 may be written using one or more programming languages, assembly languages, scripting languages, etc.

Cluster data application 122 may be implemented as a Web application. For example, cluster data application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data matrix 124 may organized to include a plurality of rows and one or more columns. The rows of data matrix 124 may be referred to as observations or records and the columns, representing variables, associated with an observation may be referred to as data points for the observation. Of course, in an alternative embodiment, data matrix 124 may be transposed and may be organized in other manners. Data matrix 124 may be stored in various compressed formats such as a coordinate format, a compressed sparse column format, a compressed sparse row format, etc.

The data stored in data matrix 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Data matrix 124 may be stored in computer-readable medium 108 or on one or more other computing devices, such as on distributed systems 132, and accessed using communication interface 106. Data matrix 124 may be stored using various formats as known to those skilled in the art including a file system, a relational database, a system of tables, a structured query language database, etc. For example, data matrix 124 may be stored in a cube distributed across a grid of computers as understood by a person of skill in the art. As another example, data matrix 124 may be stored in a multi-node Hadoop® cluster, as understood by a person of skill in the art. Apache™ Hadoop® is an open-source software framework for distributed computing. Apache Spark™, an engine for large-scale data processing may also be used.

Figure 21:
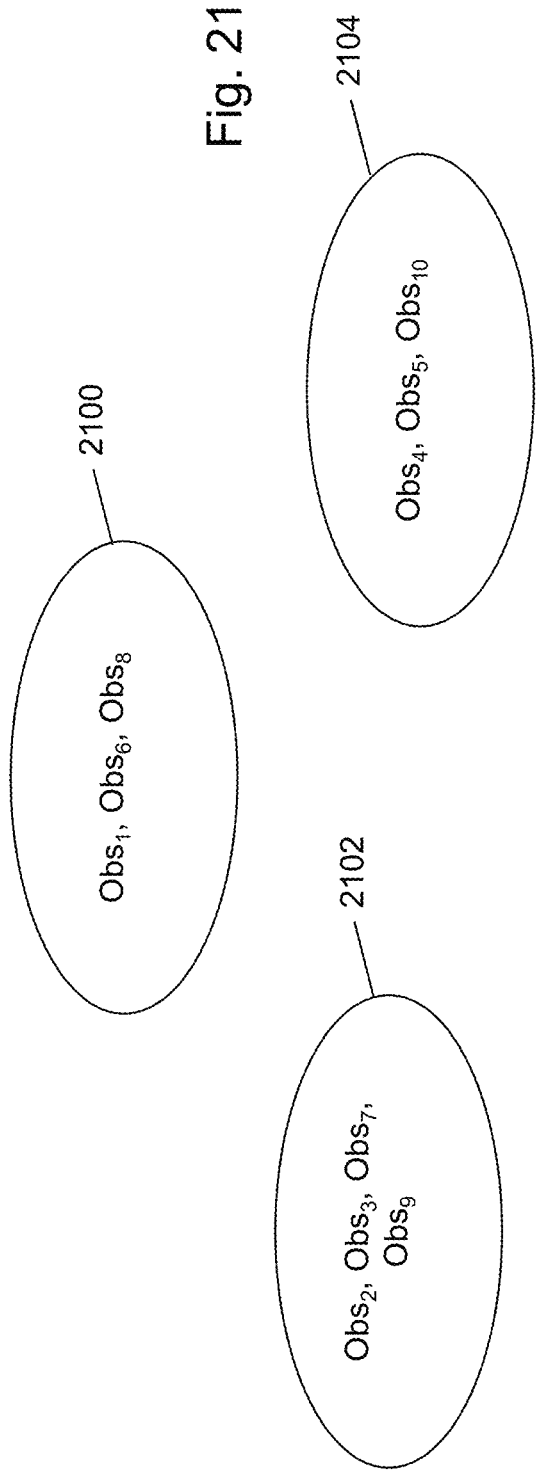
FIG. 21 depicts an example dataset distributed into three clusters in accordance with an illustrative embodiment.

For example, cluster data application 122 may be used to create cluster data 126 from observations included in data matrix 124. For example, referring to FIG. 21, ten observations, $Obs_1$, $Obs_2$, $Obs_3$, ..., $Obs_{10}$ are shown divided into a first cluster 2100, a second cluster 2102, and a third cluster 2104, where first cluster 2100 includes $Obs_1$, $Obs_6$, $Obs_8$, second cluster 2102 includes $Obs_2$, $Obs_3$, $Obs_7$, $Obs_9$, and third cluster 2104 includes $Obs_4$, $Obs_5$, $Obs_{10}$. Cluster data 126 is a transformation of data matrix 124 that may be used in support of various data mining and data analysis tasks. FIG. 21 provides an example visual representation of clusters though no visual representation is needed as understood by a person of skill in the art.

Figure 2:
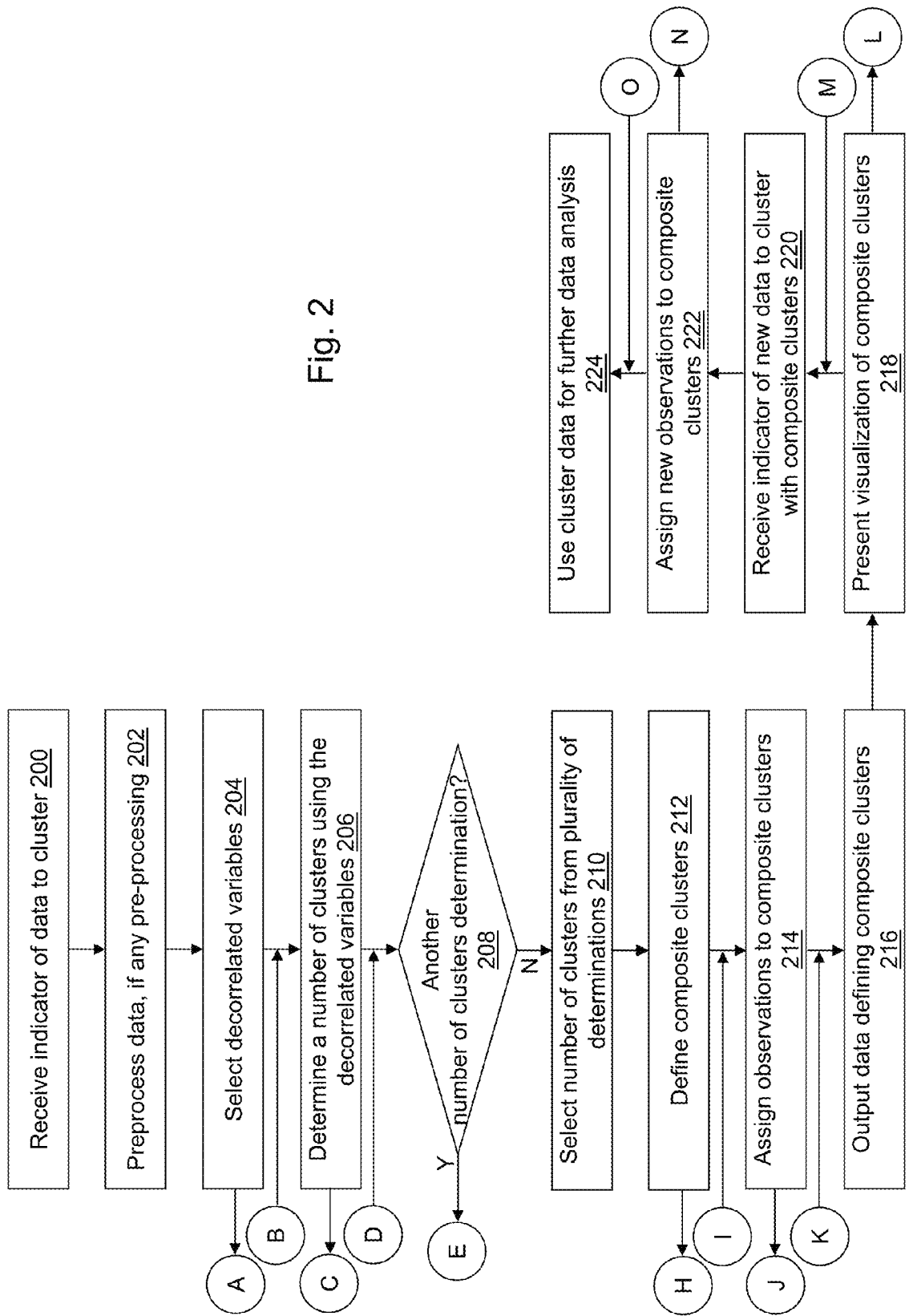
FIG. 2 depicts a flow diagram illustrating examples of operations performed by the data transformation device of FIG. 1 in accordance with an illustrative embodiment.

Referring to FIG. 2, example operations associated with cluster data application 122 are described. Additional, fewer, or different operations may be performed depending on the embodiment. The order of presentation of the operations of FIG. 2 is not intended to be limiting. Although some of the operational flows are presented in sequence, the various operations may be performed in various repetitions, concurrently (in parallel, for example, using threads), and/or in other orders than those that are illustrated. For example, a user may execute cluster data application 122, which causes presentation of a first user interface window, which may include a plurality of menus and selectors such as drop down menus, buttons, text boxes, hyperlinks, etc. associated with cluster data application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by cluster data application 122.

In an operation 200, a first indicator is received that indicates data to transform to cluster data 126. For example, the first indicator indicates a location of data matrix 124. In an alternative embodiment, the data to cluster may not be selectable. For example, a most recently created data set may be used automatically.

The first indicator may be received by cluster data application 122, for example, after selection from a user interface window or after entry by a user into a user interface window. The first indicator may further indicate that only a portion of the data stored in data matrix 124 be clustered. For example, in a large dataset only a subset of the observations may be used. First indicator may indicate a number of observations to include, a percentage of observations of the entire dataset to include, etc. A subset may be created from data matrix 124 by sampling. An example sampling algorithm is uniform sampling. Other random sampling algorithms may be used. Additionally, less than all of the columns may be used to determine the clusters. The first indicator may further indicate the subset of the columns (variables) to use to determine the clusters.

In an operation 202, the data indicated by the first indicator is pre-processed, if any pre-processing is to be performed. For example, cluster data application 122 may provide user selectable options that perform pre-processing functions. As understood by a person of skill in the art, example pre-processing functions include removing variables with an excessive number of cardinality levels, removing variables with an excessive number of missing values, imputing numeric missing values using distributional methods, imputing class variables using decision tree methods, replacing numeric outliers an excessive number of standard deviations from a mean value, binning class variable outliers, standardizing interval variables, scaling or encoding class variables, etc.

Figure 3:
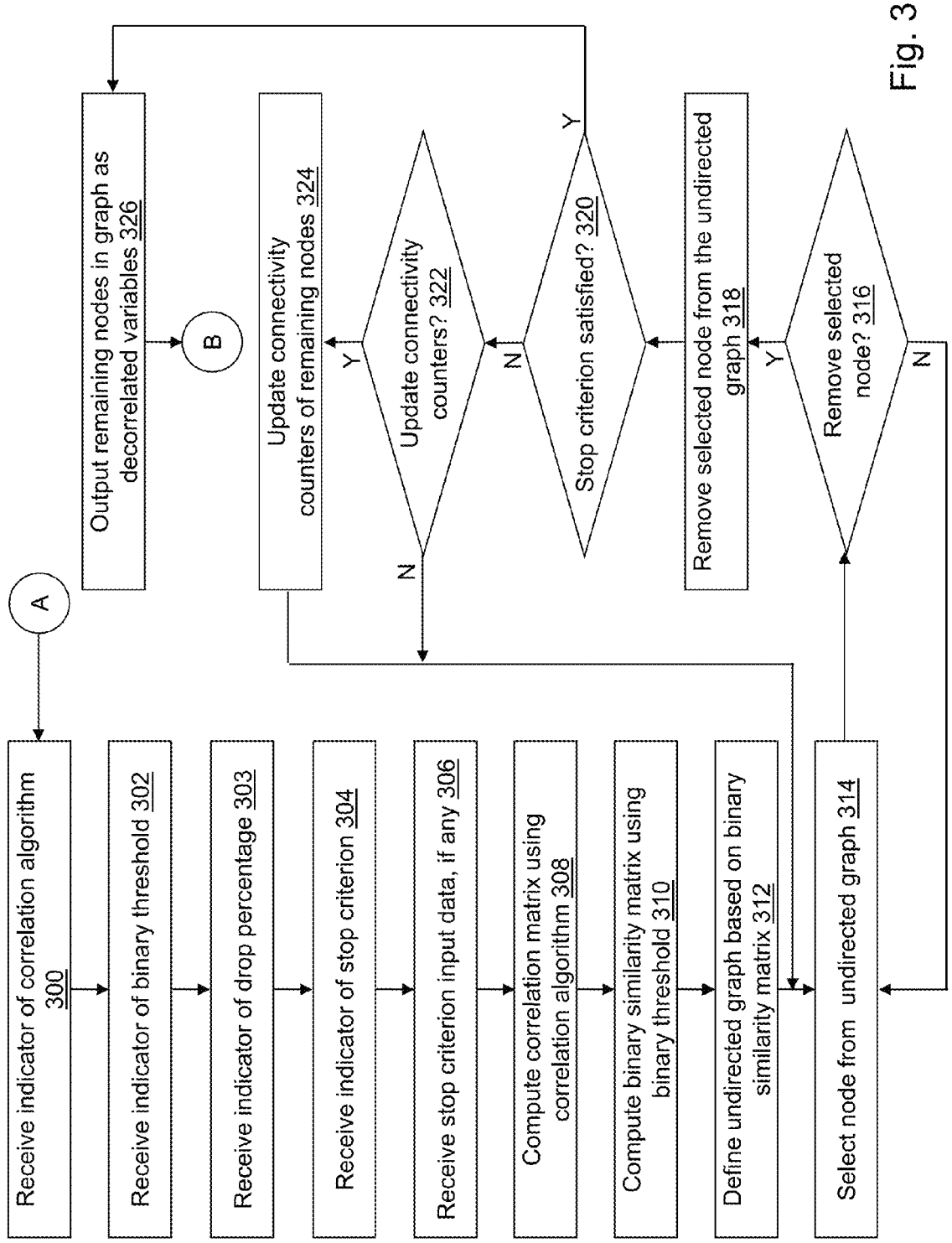
FIG. 3 depicts another flow diagram illustrating examples of operations performed by the data transformation device of FIG. 1 in accordance with an illustrative embodiment.

In an operation 204, decorrelated variables are selected. For example, the decorrelated variables may be selected from the columns included in data matrix 124. As an example, the decorrelated variables may be selected using an unsupervised graph-based method that automatically removes correlated variables from data matrix 124. Referring to FIG. 3, example operations associated with selecting the decorrelated variables using cluster data application 122 are described. The order of presentation of the operations of FIG. 3 is not intended to be limiting, and additional, fewer, or different operations may be performed depending on the embodiment.

In an operation 300, a second indicator of a correlation algorithm to execute is received. For example, the second indicator indicates a name of a correlation algorithm. The second indicator may be received by cluster data application 122 after selection from a user interface window or after entry by a user into a user interface window. A default value for the correlation algorithm to execute may further be stored, for example, in computer-readable medium 108. In an alternative embodiment, the correlation algorithm may not be selectable. An example correlation algorithm is a Pearson product-moment correlation algorithm, a Spearman rank-order correlation algorithm, an unscaled correlation algorithm, etc. as understood by a person of skill in the art.

In an operation 302, a third indicator of a binary threshold used to compute a binary similarity matrix is received. The third indicator indicates a value of the binary threshold. The third indicator may be received by cluster data application 122 after a selection from a user interface window or after entry by a user into a user interface window. A default value for the binary threshold may further be stored, for example, in computer-readable medium 108. In an alternative embodiment, the binary threshold may not be selectable. A value range for the binary threshold may vary depending on the correlation algorithm selected. For example, the value range for the binary threshold using the Pearson product-moment correlation algorithm may be between −1 and 1.

In an operation 303, a fourth indicator of a drop percentage is received. The fourth indicator indicates a value of the drop percentage. The drop percentage value is used to randomly select nodes to drop as discussed further below. The fourth indicator may be received by cluster data application 122 after a selection from a user interface window or after entry by a user into a user interface window. A default value for the drop percentage may further be stored, for example, in computer-readable medium 108. In an alternative embodiment, the drop percentage may not be selectable. A value range for the drop percentage may be 0 to 100 though other ranges may be used. For example, instead of a percentage, a decimal value may be defined.

In an operation 304, a fifth indicator of a stop criterion used to stop the decorrelated variable selection process is received. The fifth indicator may be received by cluster data application 122 after a selection from a user interface window or after entry by a user into a user interface window. A default value for the stop criterion may further be stored, for example, in computer-readable medium 108. In an alternative embodiment, the stop criterion may not be selectable.

In an operation 306, stop criterion input data, if any, is received based on the indicated stop criterion or the defined default stop criterion. For example, a value for a minimum number of variables may be received for the indicated stop criterion as discussed further below. As another example, a desired percentage of variables may be received for the indicated stop criterion as discussed further below.

In an operation 308, a correlation matrix is computed using the correlation algorithm indicated in operation 300. The correlation matrix includes a correlation value computed between each pair of variables in data matrix 124 or the subset of variables (columns) indicated in operation 200. As understood by a person of skill in the art, the correlation value may be positive or negative. For example, a value of one may indicate a total positive correlation, a value of zero may indicate no correlation, and a value of negative one may indicate a total negative correlation between the pair of variables. In general, the correlation matrix is symmetric, and the diagonal cells are equal to one.

In an operation 310, a binary similarity matrix is computed from the correlation matrix using the value of the binary threshold. The correlation value in each cell of the correlation matrix is compared to the value of the binary threshold and a one or a zero is placed in the corresponding cell of the binary similarity matrix. For example, when a positive correlation value is greater than the binary threshold or a negative correlation value is less than the negative of the binary threshold, a one may be placed in the associated cell of the binary similarity matrix indicating sufficient correlation to potentially select. Conversely, when a positive correlation value is less than the binary threshold or a negative correlation value is greater than the negative of the binary threshold, a zero may be placed in the associated cell of the binary similarity matrix. When the correlation matrix is symmetric and the diagonal cells are equal to one, these cells may not need to be compared to the binary threshold.

In an operation 312, an undirected graph is defined based on the binary similarity matrix where the correlated variables are connected nodes in the undirected graph. For example, the undirected graph is defined to capture connectivity between variables when the value of the associated cell is one to indicate correlated variables.

Figure 4:
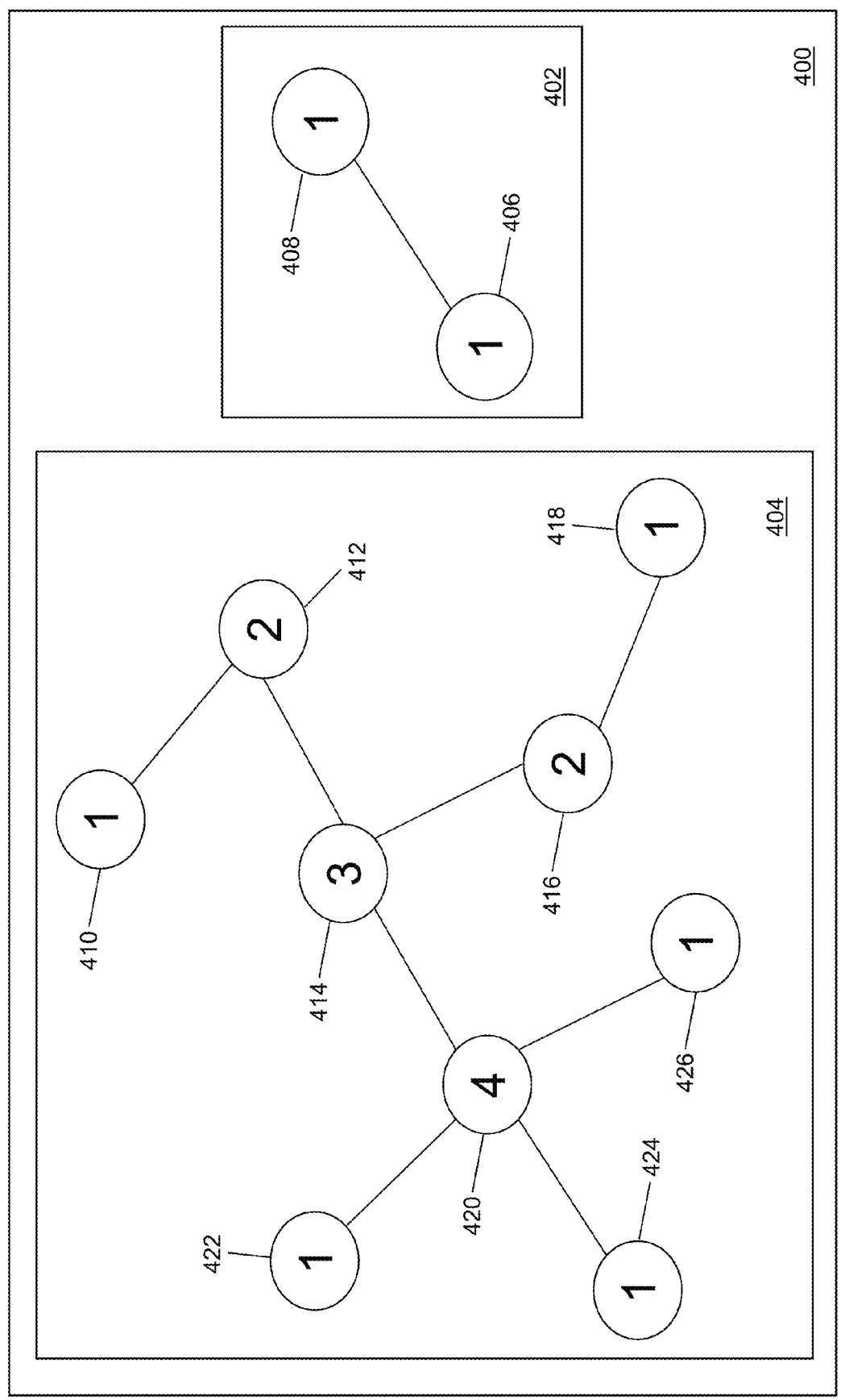
FIGS. 4-8 depict an undirected graph including a plurality of subgraphs in accordance with an illustrative embodiment.

For illustration, referring to FIG. 4, a first undirected graph 400 is shown. FIG. 4 provides an example visual representation of an undirected graph though no visual representation is needed as understood by a person of skill in the art. The undirected graph may be a data structure that stores the connectivity information for the variables. First undirected graph 400 may include a first subgraph 402 and a second subgraph 404. A subgraph is a group of one or more connected nodes. First undirected graph 400 may include a fewer or a greater number of subgraphs. For example, all of the nodes may be connected such that first undirected graph 400 includes a single subgraph. First subgraph 402 may include a first node 406 and a second node 408. Second subgraph 404 may include a third node 410, a fourth node 412, a fifth node 414, a sixth node 416, a seventh node 418, an eighth node 420, a ninth node 422, a tenth node 424, and an eleventh node 426.

Each node is associated with a variable in the binary similarity matrix. For example, a first variable is associated with first node 406, a second variable is associated with second node 408, a third variable is associated with third node 410, a fourth variable is associated with fourth node 412, a fifth variable is associated with fifth node 414, a sixth variable is associated with sixth node 416, a seventh variable is associated with seventh node 418, a eighth variable is associated with eighth node 420, a ninth variable is associated with ninth node 422, a tenth variable is associated with tenth node 424, and an eleventh variable is associated with eleventh node 426.

The number shown in each node indicates a connectivity counter value for that node determined based on a number of connections between that variable and other variables based on values in the binary similarity matrix. The connections exist because the binary similarity matrix includes a one (or other predefined value) in the cell between that pair of variables. As an example, the fourth variable associated with fourth node 412 is sufficiently correlated (e.g., correlation value>binary threshold or correlation value<−binary threshold) with the third variable associated with third node 410 and with the fifth variable associated with fifth node 414 to connect these variables in second subgraph 404; the fifth variable associated with fifth node 414 is also sufficiently correlated with the sixth variable associated with sixth node 416 and with the eighth variable associated with eighth node 420 to connect these variables in second subgraph 404; and so on as indicated in first undirected graph 400.

Referring again to FIG. 3, in an operation 314, a node is selected from the undirected graph. As an example, any node of the least connected nodes (as indicated by a minimum value of the connectivity counter values) may be selected from the undirected graph. For illustration, and referring again to FIG. 4, the least connected nodes are first node 406 and second node 408 of first subgraph 402, and third node 410, seventh node 418, ninth node 422, tenth node 424, and eleventh node 426 of second subgraph 404. As an example, first node 406 may be selected. As another example, seventh node 418 may be selected randomly from third node 410, seventh node 418, ninth node 422, tenth node 424, and eleventh node 426 of second subgraph 404.

Referring again to FIG. 3, in an operation 316, a determination is made concerning whether or not the selected node is removed. If the selected node is removed, processing continues in an operation 318. If the selected node is not removed, processing continues in operation 314 to select a different node from the least connected nodes remaining in the undirected graph.

For illustration, a random draw value may be determined using a statistical distribution, such as a uniform statistical distribution, as understood by a person of skill in the art. Other statistical distributions may be used and may be user selectable in a process similar to that described with reference to operation 300, but for a statistical distribution algorithm. The random draw value is compared to the drop percentage value to determine whether or not a node is removed from a subgraph. A constraint may be that at least one node is kept for each subgraph initially defined in operation 312.

In operation 318, the selected node is removed from the undirected graph. Assuming that input variables that are highly correlated to other input variables are generally representative of each other, correlation between the input variables is removed while preserving the most representative variables by successively removing the least connected nodes. For example, the drop percentage value is used to remove the least connected nodes from each subgraph.

For illustration, in operation 314, first node 406 may be selected from first subgraph 402, and a first random draw value determined in operation 316. When the first random draw value is greater than the drop percentage value, first node 406 is not removed from first subgraph 402, and processing continues in operation 314. When the first random draw value is less than the drop percentage value, first node 406 is removed from first subgraph 402 in operation 318. Of course, the less than and greater than tests may be reversed, and the first random draw value equal to the drop percentage value may be designed to trigger either removing or not removing the node.

In an operation 320, after removal of the selected node, a determination is made concerning whether or not a stop criterion is satisfied. If the stop criterion is satisfied, processing continues in an operation 326. If the stop criterion is not satisfied, processing continues in an operation 322.

For example, a stop criterion may test whether or not there is a subgraph in the undirected graph that includes more than one node. The stop criterion may be satisfied when each subgraph includes a single node.

As another example, a stop criterion may test whether or not a number of remaining nodes (variables) in the undirected graph is equal to the minimum number of variables optionally defined in operation 306. The stop criterion may be satisfied when the number of remaining nodes equals the minimum number of variables.

As still another example, a stop criterion may test whether or not a percentage of original nodes (variables) in the undirected graph remain. For example, a desired number of remaining variables may be initialized in operation 312, after defining the undirected graph, as a percentage of the number of nodes in the undirected graph. The desired percentage of nodes (variables) used to determine the desired number of remaining variables may be optionally defined in operation 306. The stop criterion may be satisfied when the number of remaining nodes equals the desired number of remaining variables.

In operation 322, a determination is made concerning whether or not the connectivity counters associated with each node in the undirected graph are updated to reflect the removed node. When the connectivity counters are updated, processing continues in an operation 324. By updating the connectivity counters, the least connected nodes are redefined. When the connectivity counters are not updated, processing continues in operation 314 to select a different node from the least connected nodes remaining in the undirected graph. By not updating the connectivity counters, the currently defined least connected nodes remain the same.

In operation 324, the connectivity counter values for each node in the undirected graph are updated to reflect lost connectivity between nodes when nodes are removed from the undirected graph in operation 318 resulting in a new set of least connected nodes. Processing continues in operation 314 to select a different node from the least connected nodes remaining in the undirected graph.

Referring again to FIG. 4, after testing first node 406 of first subgraph 402 and each of third node 410, seventh node 418, ninth node 422, tenth node 424, and eleventh node 426 from second subgraph 404 for removal, first node 406, third node 410, and tenth node 424 may have been selected for removal. For example, third node 410 may be selected from second subgraph 404, and a second random draw value determined. When the second random draw value is less than the drop percentage value, third node 410 is removed from second subgraph 404. Seventh node 418 may be selected from second subgraph 404, and a third random draw value determined. When the third random draw value is greater than the drop percentage value, seventh node 418 is not removed from second subgraph 404. Ninth node 422 may be selected from second subgraph 404, and a fourth random draw value determined. When the fourth random draw value is greater than the drop percentage value, ninth node 422 is not removed from second subgraph 404. Tenth node 424 may be selected from second subgraph 404, and a fifth random draw value determined. When the fifth random draw value is less than the drop percentage value, tenth node 424 is removed from second subgraph 404. Eleventh node 426 may be selected from second subgraph 404, and a sixth random draw value determined. When the sixth random draw value is greater than the drop percentage value, eleventh node 426 is not removed from second subgraph 404.

Figure 5:
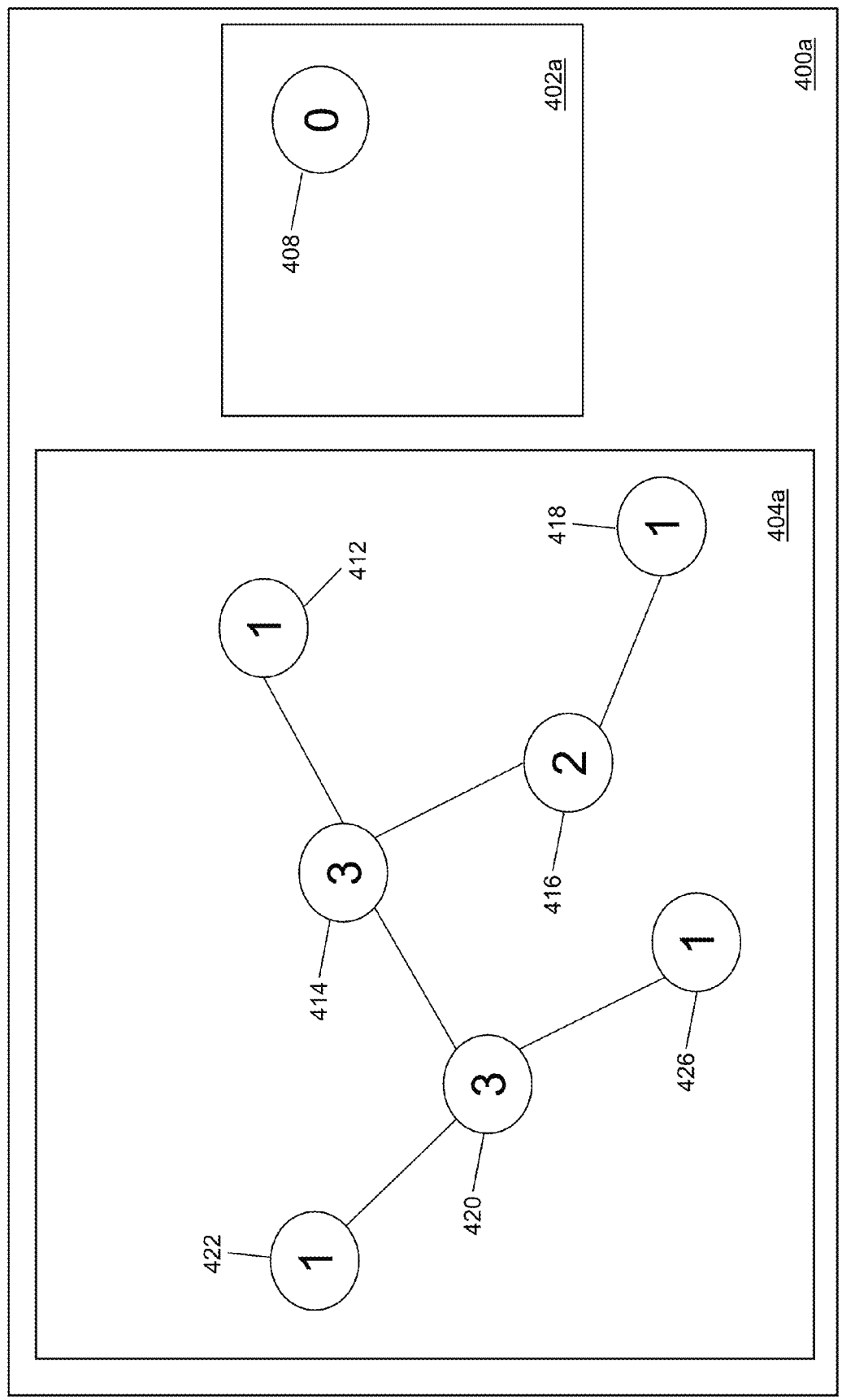

Referring to FIG. 5, a second undirected graph 400a is shown after removing first node 406, third node 410, and tenth node 424 and updating the connectivity counter values for each node. Second undirected graph 400a may include third subgraph 402a and fourth subgraph 404a. Third subgraph 402a may include second node 408. Fourth subgraph 404a may include fourth node 412, fifth node 414, sixth node 416, seventh node 418, eighth node 420, ninth node 422, and eleventh node 426. Because only second node 408 of first subgraph 402 remains in first subgraph 402, third subgraph 402a may not be processed further, and the second variable associated with second node 408 may be selected as a decorrelated variable.

Figure 6:
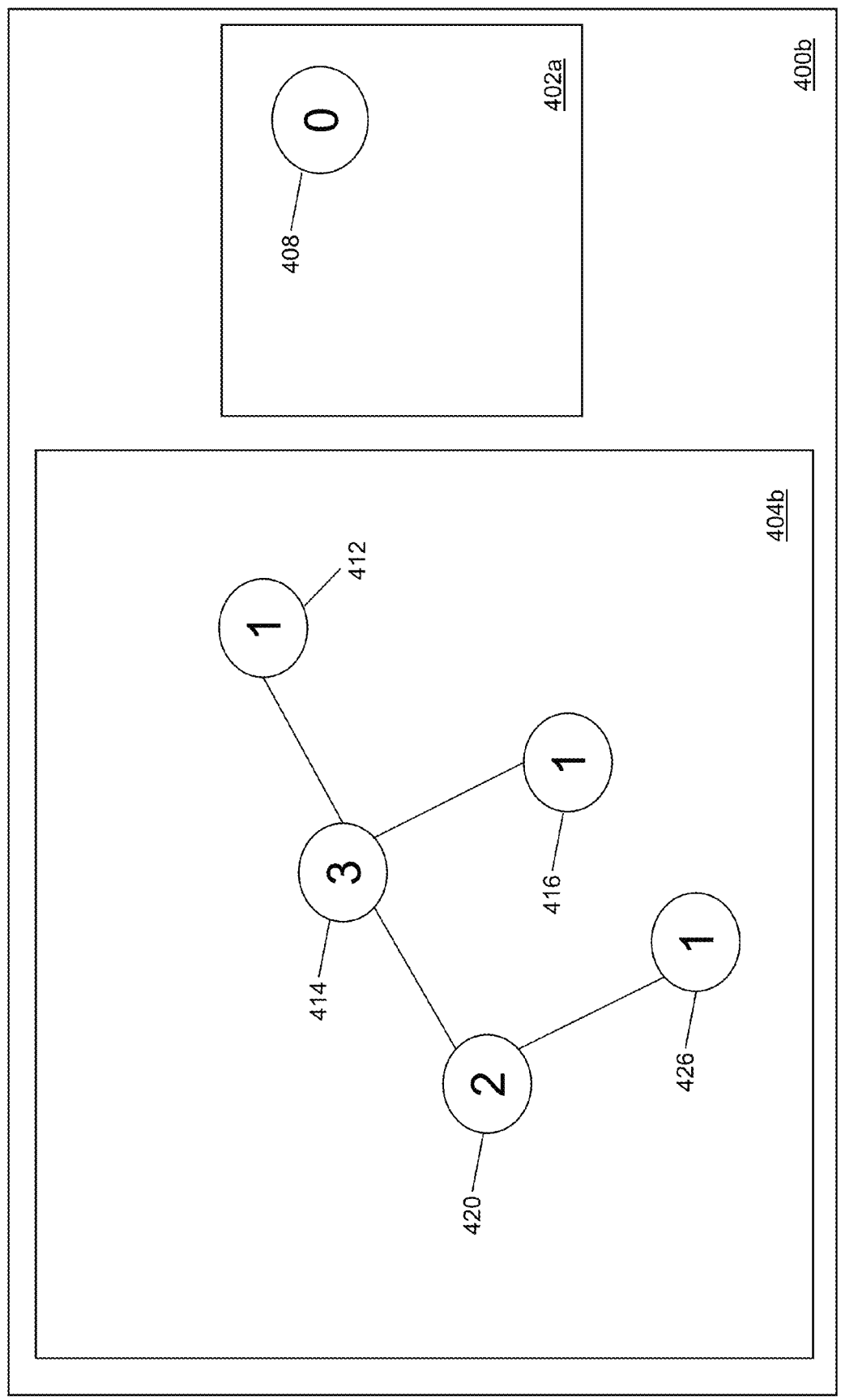

Fourth node 412, seventh node 418, ninth node 422, and eleventh node 426 of fourth subgraph 404a are now the least connected nodes from which a node is selected in operation 314. Referring to FIG. 6, a third undirected graph 400b is shown after removing seventh node 418 and ninth node 422 from fourth subgraph 404a, based on additional random draw values, and updating the connectivity counter values for each node in third undirected graph 400b. Third undirected graph 400b may include third subgraph 402a and a fifth subgraph 404b. Fifth subgraph 404b may include fourth node 412, fifth node 414, sixth node 416, eighth node 420, and eleventh node 426.

Figure 7:
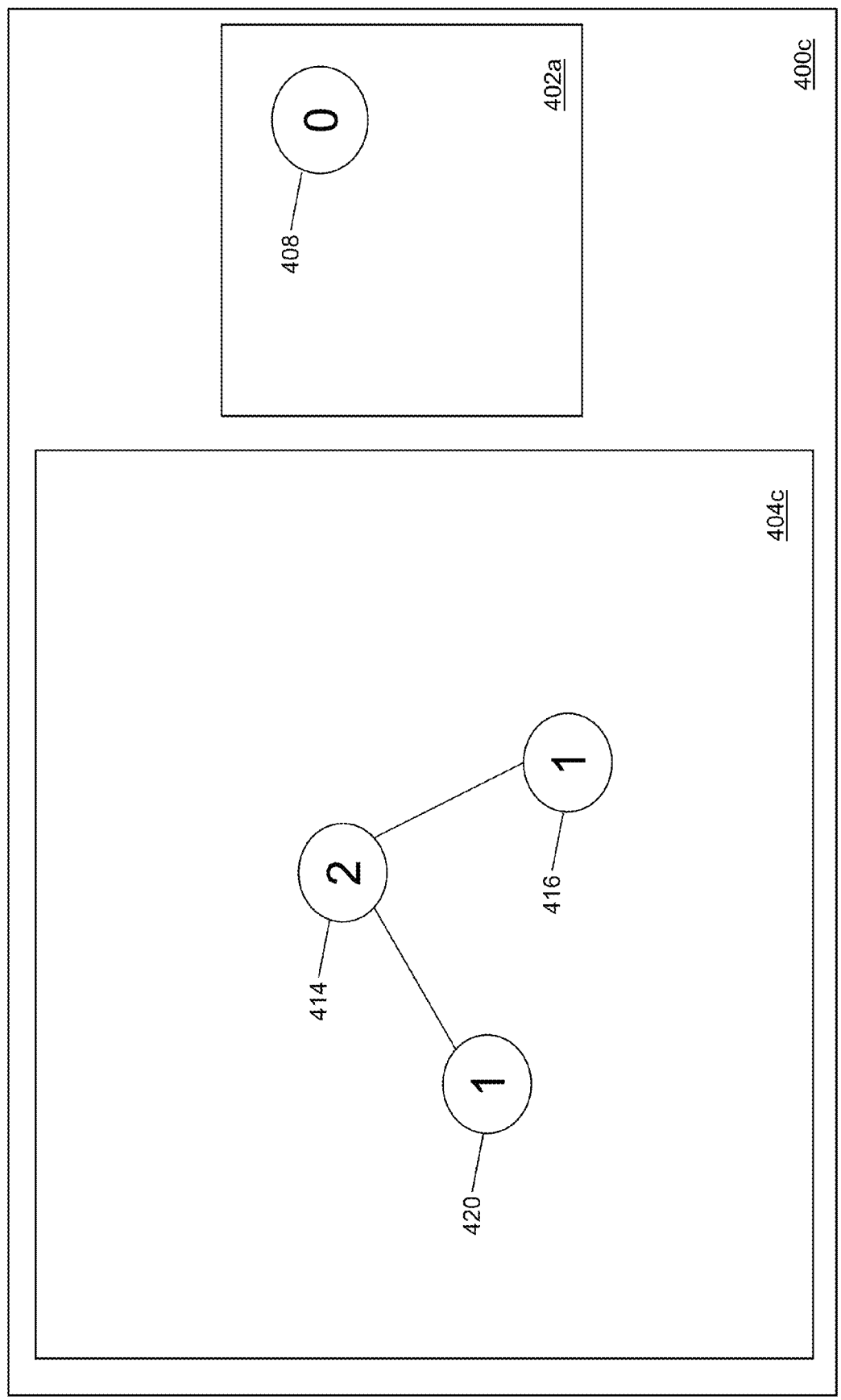

Fourth node 412, sixth node 416, and eleventh node 426 of fifth subgraph 404b are now the least connected nodes from which a node is selected in operation 314. Referring to FIG. 7, a fourth undirected graph 400c is shown after removing fourth node 412 and eleventh node 426 from fifth subgraph 404b, based on additional random draw values, and updating the connectivity counter values for each node in third undirected graph 400b. Fourth undirected graph 400c may include third subgraph 402a and a sixth subgraph 404c. Sixth subgraph 404c may include fifth node 414, sixth node 416, and eighth node 420.

Figure 8:
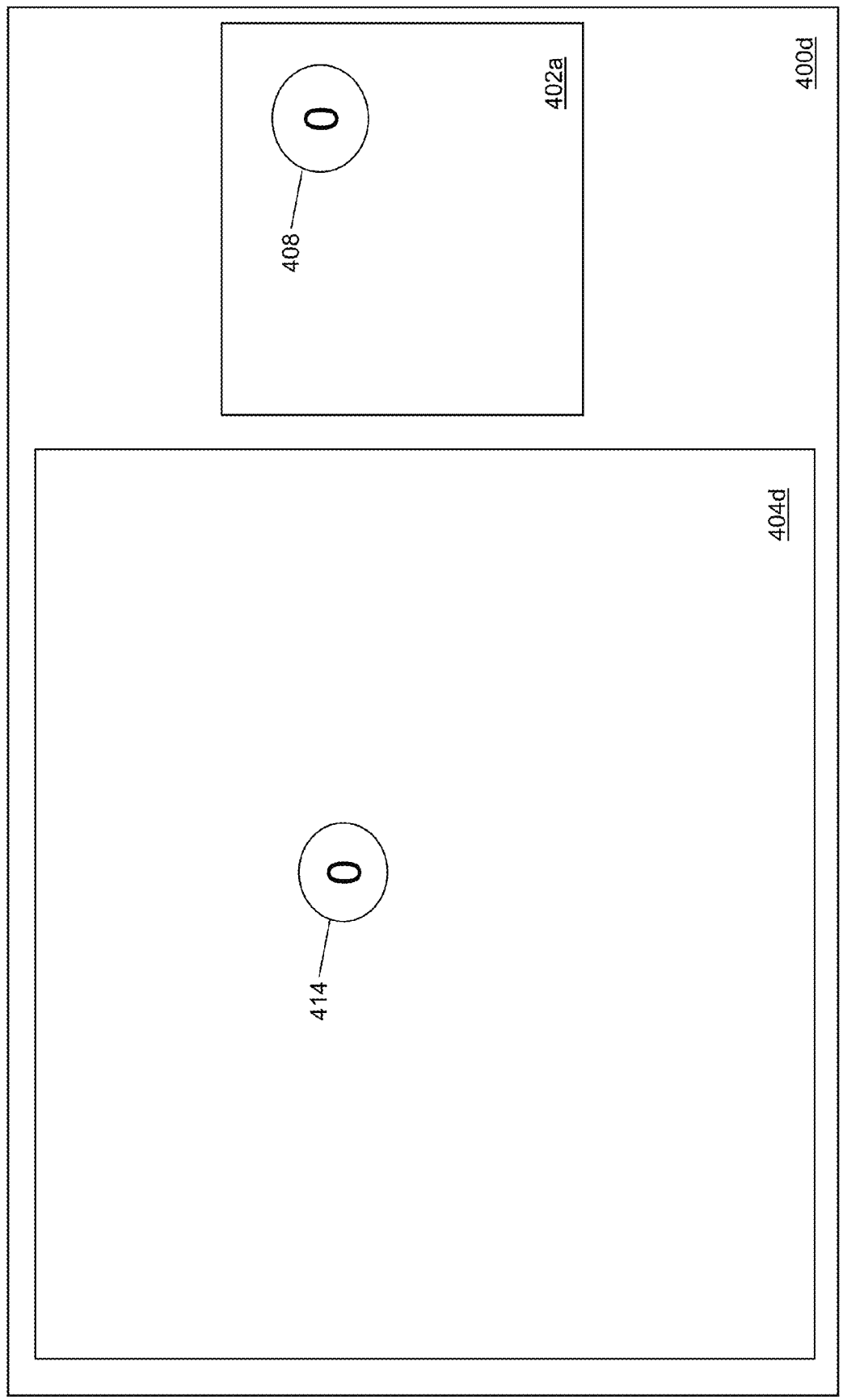

Sixth node 416 and eighth node 420 of sixth subgraph 404c are now the least connected nodes from which a node is selected in operation 314. Referring to FIG. 8, a fifth undirected graph 400d is shown after removing sixth node 416 and eighth node 420 from sixth subgraph 404c, based on additional random draw values, and updating the connectivity counter values for each node in fourth undirected graph 400c. Fifth undirected graph 400d may include third subgraph 402a and a seventh subgraph 404d. Seventh subgraph 404d may include fifth node 414. Because only fifth node 414 remains in seventh subgraph 404d, seventh subgraph 404d may not be processed further, and the fifth variable associated with fifth node 414 may be selected as a decorrelated variable.

Referring again to FIG. 3, in operation 326, the remaining nodes in the undirected graph when the stop criterion is satisfied are output as the decorrelated variables. As examples, the decorrelated variables may be stored in computer-readable medium 108 and/or may be output to the user using display 116 or printer 120. For example, in the illustrative embodiment of FIG. 8, the second variable associated with second node 408 and the fifth variable associated with fifth node 414 are output as the decorrelated variables by storing in computer-readable medium 108. Reducing the number of variables decreases an execution time of further processing performed by cluster data application 122.

Figure 9:
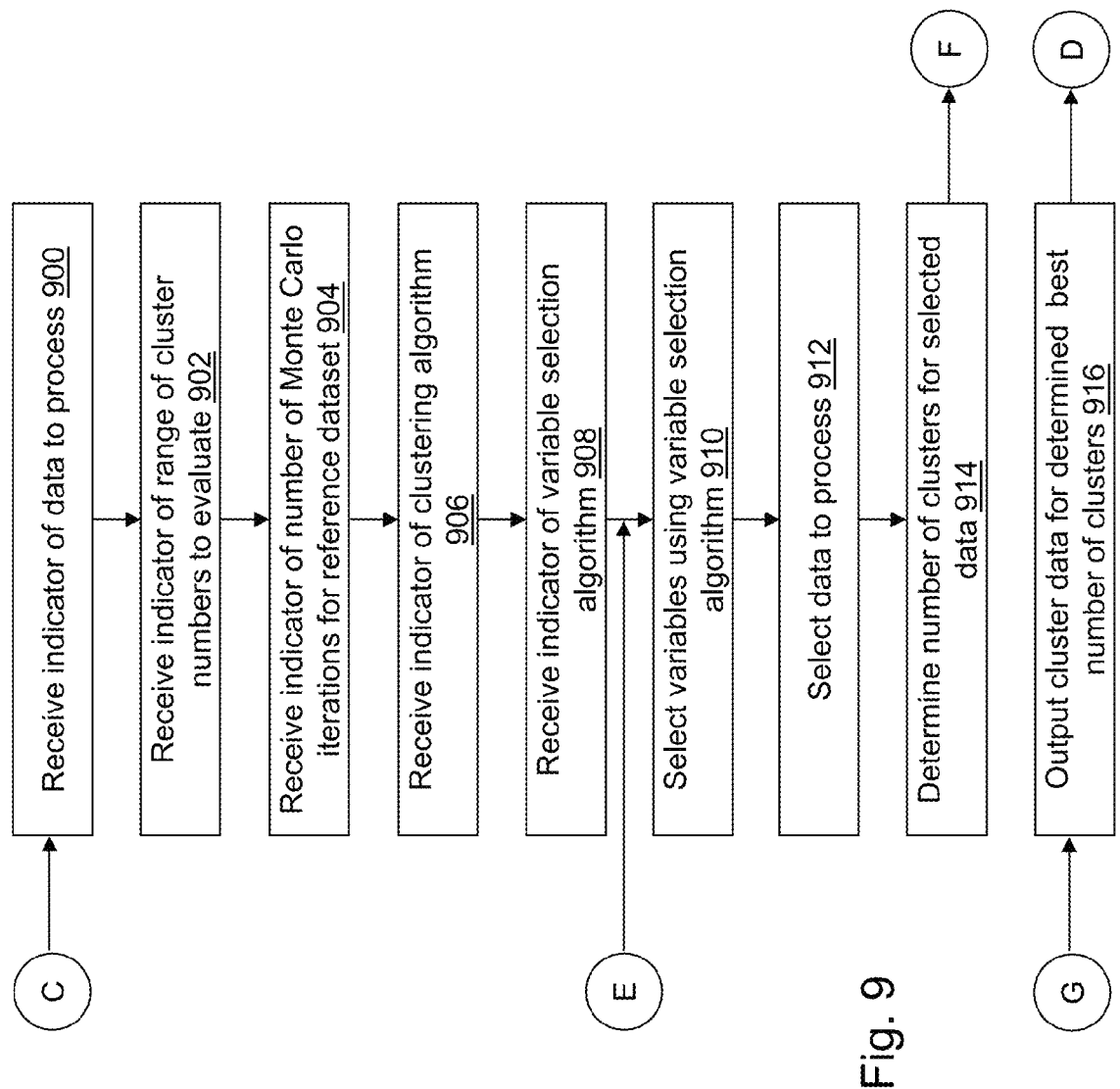
FIG. 9 depicts another flow diagram illustrating examples of operations performed by the data transformation device of FIG. 1 in accordance with an illustrative embodiment.

Referring again to FIG. 2, processing may continue in an operation 206. In operation 206, a number of clusters is determined using the decorrelated variables selected in operation 204. As an example, the number of clusters may be determined using a clustering algorithm that automatically determines a number of clusters for the selected correlated variables using data in data matrix 124. Referring to FIG. 9, example operations are described that are associated with determining the number of clusters using cluster data application 122. The order of presentation of the operations of FIG. 9 is not intended to be limiting, and additional, fewer, or different operations may be performed depending on the embodiment.

In an operation 900, a sixth indicator is received that indicates data to continue processing. For example, the sixth indicator may indicate a location of data matrix 124 and the selected decorrelated variables that identify columns in data matrix 124. In an alternative embodiment, the sixth indicator may not indicate the selected decorrelated variables and may use all of the variables or variables selected using a different process, such as selection by a user. The sixth indicator may be received by cluster data application 122, for example, after selection from a user interface window or after entry by a user into a user interface window. The sixth indicator may include information from the first indicator. The sixth indicator may further indicate that only a portion of the data stored in data matrix 124 be clustered whether or not the first indicator indicated that only a portion of the data stored in data matrix 124 be clustered. For example, in a large dataset only a subset of the observations may be used to determine the number of clusters. Sixth indicator may indicate a number of observations to include, a percentage of observations of the entire dataset to include, etc. A subset may be created from data matrix 124 by sampling.

In an operation 902, a seventh indicator of a range of numbers of clusters to evaluate is received. For example, the seventh indicator indicates a minimum number of clusters to evaluate and a maximum number of clusters to evaluate. The seventh indicator may further indicate an increment that is used to define an incremental value for incrementing from the minimum to the maximum number of clusters or vice versa. Of course, the incremental value may be or default to one. The seventh indicator may be received by cluster data application 122 after selection from a user interface window or after entry by a user into a user interface window. Default values for the range of numbers of clusters to evaluate may further be stored, for example, in computer-readable medium 108. In an alternative embodiment, the range of numbers of clusters to evaluate may not be selectable.

In an operation 904, an eighth indicator of a number of Monte Carlo iterations to execute for a reference dataset is received. The eighth indicator may be received by cluster data application 122 after a selection from a user interface window or after entry by a user into a user interface window. A default value for the number of Monte Carlo iterations to execute for generating reference datasets may further be stored, for example, in computer-readable medium 108. In an alternative embodiment, the number of Monte Carlo iterations may not be selectable.

In an operation 906, a ninth indicator of a clustering algorithm to execute to cluster the data and the reference dataset is received. For example, the ninth indicator indicates a name of a clustering algorithm. The ninth indicator may be received by cluster data application 122 after selection from a user interface window or after entry by a user into a user interface window. A default value for the clustering algorithm to execute may further be stored, for example, in computer-readable medium 108. In an alternative embodiment, the clustering algorithm may not be selectable. Example clustering algorithms include the k-means algorithm, Ward's minimum-variance algorithm, a hierarchical algorithm, a median algorithm, McQuitty's similarity analysis algorithm, or other algorithms based on minimizing the cluster residual sum of squares as understood by a person of skill in the art.

In an operation 908, a tenth indicator of a variable selection algorithm to execute to cluster the data and the reference dataset is received. For example, the tenth indicator indicates a name of a statistical distribution algorithm. The tenth indicator may further include values associated with parameters used to define the statistical distribution algorithm. For example, if the statistical distribution algorithm indicated is "Normal Distribution", the parameter may be a standard deviation and/or a mean. As another example, if the statistical distribution algorithm indicated is "Uniform Distribution", the parameter may be a probability threshold. The tenth indicator may be received by cluster data application 122 after selection from a user interface window or after entry by a user into a user interface window. A default value for the statistical distribution algorithm to execute may further be stored, for example, in computer-readable medium 108. In an alternative embodiment, the statistical distribution algorithm may not be selectable.

In an operation 910, one or more variables are selected from data matrix 124 using the variable selection algorithm. For example, the one or more variables may be selected from the selected decorrelated variables randomly using the variable selection algorithm. The same or a different number of the one or more variables may be selected for each iteration of operation 910. Selecting random subsets from the selected decorrelated variables corresponds to random projections of the data in data matrix 124 onto multiple subspaces of the original input space. Each subspace is defined by the selected decorrelated variables.

In an operation 912, observation data points for the selected one or more variables are selected from data matrix 124. The number of the observation data points selected may be all or less than all of the observation data points for the selected one or more variables included in data matrix 124 due to sampling.

Figure 10:
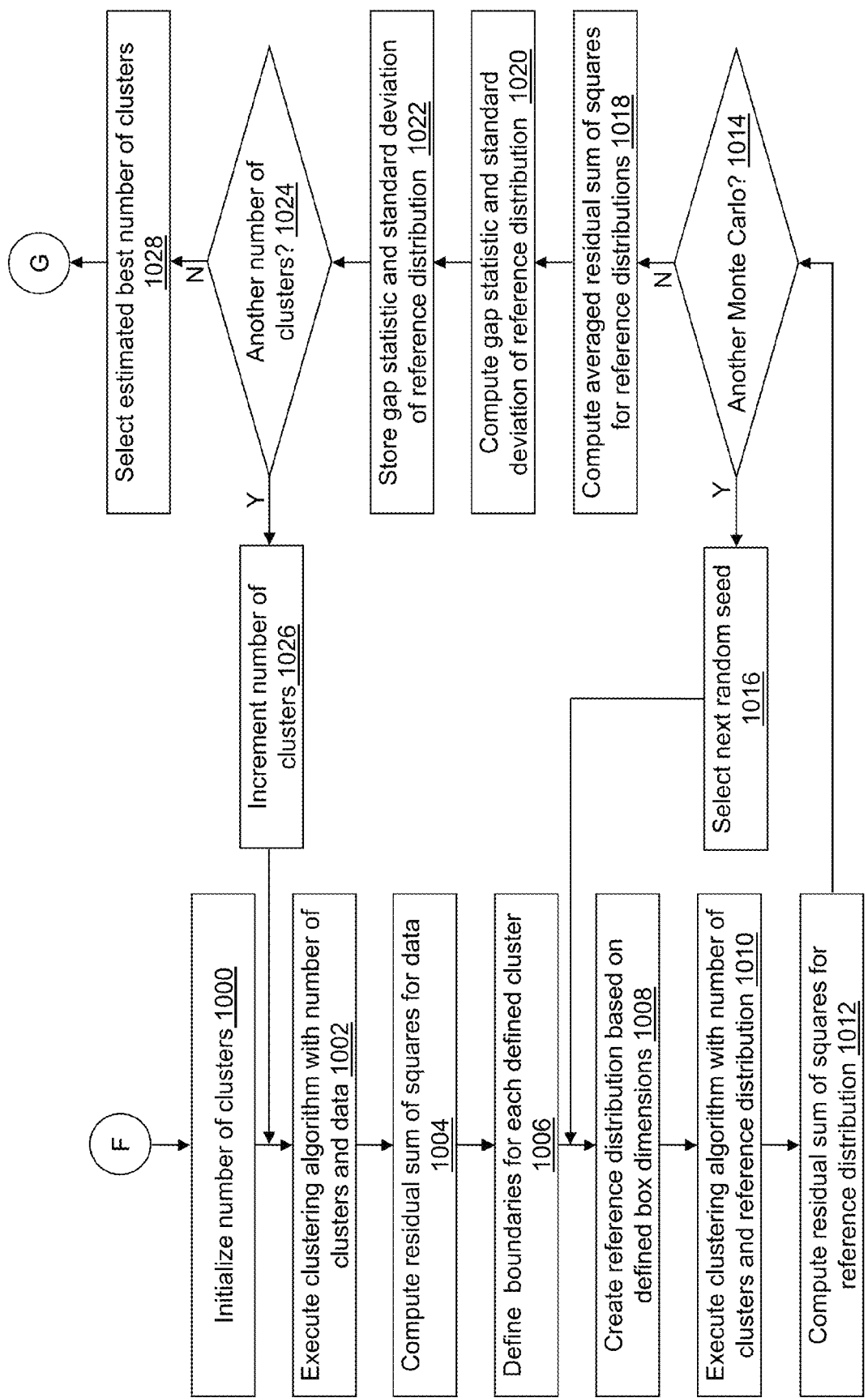
FIG. 10 depicts another flow diagram illustrating examples of operations performed by the data transformation device of FIG. 1 in accordance with an illustrative embodiment.

In an operation 914, a number of clusters is determined using the selected observation data points for the selected one or more variables. For illustration, the number of clusters is determined using the selected observation data points and clustering in the input space without transforming to another space. As an example, the number of clusters may be determined using example operations described with reference to FIG. 10. The order of presentation of the operations of FIG. 10 is not intended to be limiting, and additional, fewer, or different operations may be performed depending on the embodiment.

In an operation 1000, a number of clusters is initialized. For example, the number of clusters may be initialized to the minimum number of clusters to evaluate or to the maximum number of clusters to evaluate defined in operation 902.

In an operation 1002, the clustering algorithm indicated in operation 906 is executed to cluster the data selected in operation 912 into the defined number of clusters. The number of clusters may be defined based on the initialized number of clusters defined in operation 1000 or in an operation 1026. The executed clustering algorithm may be selected for execution based on the ninth indicator. The clustering algorithm performs a cluster analysis on the basis of distances that are computed from the selected one or more variables. The selected observation data points are divided into clusters such that each observation belongs to a single cluster. Additionally, the clustering algorithm defines a centroid location for each cluster.

In an operation 1004, a first residual sum of squares is computed for the defined clusters as $W_k = \Sigma_{j=1}^{k} \Sigma_{i=1}^{n_j} \|x_{i,j} - c_j\|^2$, where k is the defined number of clusters, $n_j$ is a number of data points in cluster j of the defined clusters, $x_{i,j}$ is an ith observation data point in cluster j of the defined clusters, and $c_j$ is a centroid location of cluster j of the defined clusters.

In an operation 1006, a boundary is defined for each of the clusters defined in operation 1004. For example, a minimum value and a maximum value are defined for each dimension of each cluster to define a possibly multi-dimensional box depending on a number of the selected one or more variables defined in operation 910.

In an operation 1008, a reference distribution is created. The reference distribution includes a new plurality of data points. The new plurality of data points are created within the defined boundary of at least one cluster of the defined clusters. The new data points may be selected based on a uniform distribution within the boundary of each defined cluster. For example, a first plurality of data points are created within the boundary defined for a first cluster of the defined clusters, a second plurality of data points are created within the boundary defined for a second cluster of the defined clusters, a third plurality of data points are created within the boundary defined for a third cluster of the defined clusters, and so on up to the number of clusters created.

In an illustrative embodiment, $n^*_j$, a number of data points in cluster j of the reference distribution is selected based on $n_j$, the number of data points in cluster j of the clusters defined in operation 1002. For example, $n^*_j$ may be proportional to $n_j$. The proportion may be less than one, equal to one, or greater than one. The proportion may be predefined by a user or based on a default value. In another illustrative embodiment, $n^*_j$ is a predetermined number of data points regardless of the value of $n_j$. The reference distribution data may be created and stored on one or more devices and/or on computer-readable medium 108.

In an operation 1010, the clustering algorithm indicated in operation 906 is executed to cluster the reference distribution created in operation 1008 into the defined number of clusters. The data may be received from one or more devices through communication interface 106 and/or may be received from storage in computer-readable medium 108.

In an operation 1012, a second residual sum of squares is computed for the clusters defined using the reference distribution created in operation 1008 (second clusters) as $W^*_{kb} = \Sigma_{j=1}^{k} \Sigma_{i=1}^{n^*_j} \|x^*_{i,j} - c^*_j\|^2$, where b is an index for a Monte Carlo iteration number, $n^*_j$ is the number of data points in cluster j of the defined second clusters, $x^*_{i,j}$ is the ith observation in cluster j of the defined second clusters, and $c^*_j$ is the centroid location of cluster j of the defined second clusters.

In an operation 1014, a determination is made concerning whether or not another Monte Carlo iteration is to be executed. If another Monte Carlo iteration is to be executed, processing continues in an operation 1016. If the number of Monte Carlo iterations indicated by the third indicator has been executed, processing continues in an operation 1018. In an alternative embodiment, instead of pre-determining a number of Monte Carlo iterations as the number of repetitions of operations 1008, 1010, and 1012, an evaluation may be made by a user to determine when the results appear satisfactory or stable based on a display of a line or curve showing an average or a dispersion of the number of clusters.

In operation 1016, a next random seed is selected for the next Monte Carlo iteration. Processing continues in operation 1008 to create another reference distribution. Because the data points included in the reference distribution are selected based on sampling within the boundary of each defined cluster, changing the random seed changes the data points included in the next reference distribution. If data transformation device 100 is multi-threaded, operations 1008, 1010, and 1012 may be performed concurrently.

In operation 1018, an averaged residual sum of squares is computed for the Monte Carlo iterations as $$W^*_k = \frac{1}{B} \sum_{b=1}^{B} \log\left(\sum_{j=1}^{k} \sum_{i=1}^{n^*_j} \|x^*_{i,j} - c^*_j\|^2\right) \text{ or }$$

$$W^*_k = \frac{1}{B} \sum_{b=1}^{B} \log(W^*_{kb}),$$

where B is the number of Monte Carlo iterations or the number of the plurality of times that operation 1008 is repeated.

In an operation 1020, a gap statistic is computed for the defined number of clusters as $gap(k) = W^*_k - \log(W_k)$. In operation 1020, a standard deviation is also defined for the defined number of clusters as $$sd(k) = \left[\frac{1}{B} \sum_{b=1}^{B} (\log(W^*_{kb}) - W^*_k)^2\right]^{1/2}.$$

The gap statistic is not a constant when k=1. To avoid this, the gap statistic may be normalized. For example, the gap statistic may be normalized as $$Normgap(k) = \frac{W^*_k}{W^*_1} - \log\left(\frac{W_k}{W_1}\right),$$

which equals zero for k=1. As another example, the gap statistic may be normalized as $$Normgap(k) = \frac{W^*_k - \log(W_k)}{E(W^*_k - \log(W_k))},$$

where E(.) is the empirical expectation. As yet another example, the gap statistic may be normalized as $Normgap(k) = W^*_k - \log(W_k) - E(W^*_k - \log(W_k))$. As still another example, the gap statistic may be normalized as $$Normgap(k) = \frac{W_k^* - \log(W_k) - E(W_k^* - \log(W_k))}{std(W_k^* - \log(W_k))},$$

where std(.) is the empirical standard deviation.

In an operation 1022, the computed gap statistic and the computed standard deviation are stored in association with the defined number of clusters. For example, the computed gap statistic and the computed standard deviation are stored in computer-readable medium 108 indexed by the defined number of clusters.

In an operation 1024, a determination is made concerning whether or not another iteration is to be executed with a next number of clusters. For example, the determination may compare the current defined number of clusters to the minimum number of clusters or the maximum number of clusters to determine if each iteration has been executed as understood by a person of skill in the art. If another iteration is to be executed, processing continues in an operation 1026. If each of the iterations has been executed, processing continues in an operation 1028.

In operation 1026, a next number of clusters is defined by incrementing or decrementing a counter of the number of clusters from the minimum number of clusters or the maximum number of clusters, respectively. Processing continues in operation 1002 to execute the clustering algorithm with the next number of clusters as the defined number of clusters. If data transformation device 100 is multi-threaded, operations 1002-1026 may be performed concurrently.

Figure 22:
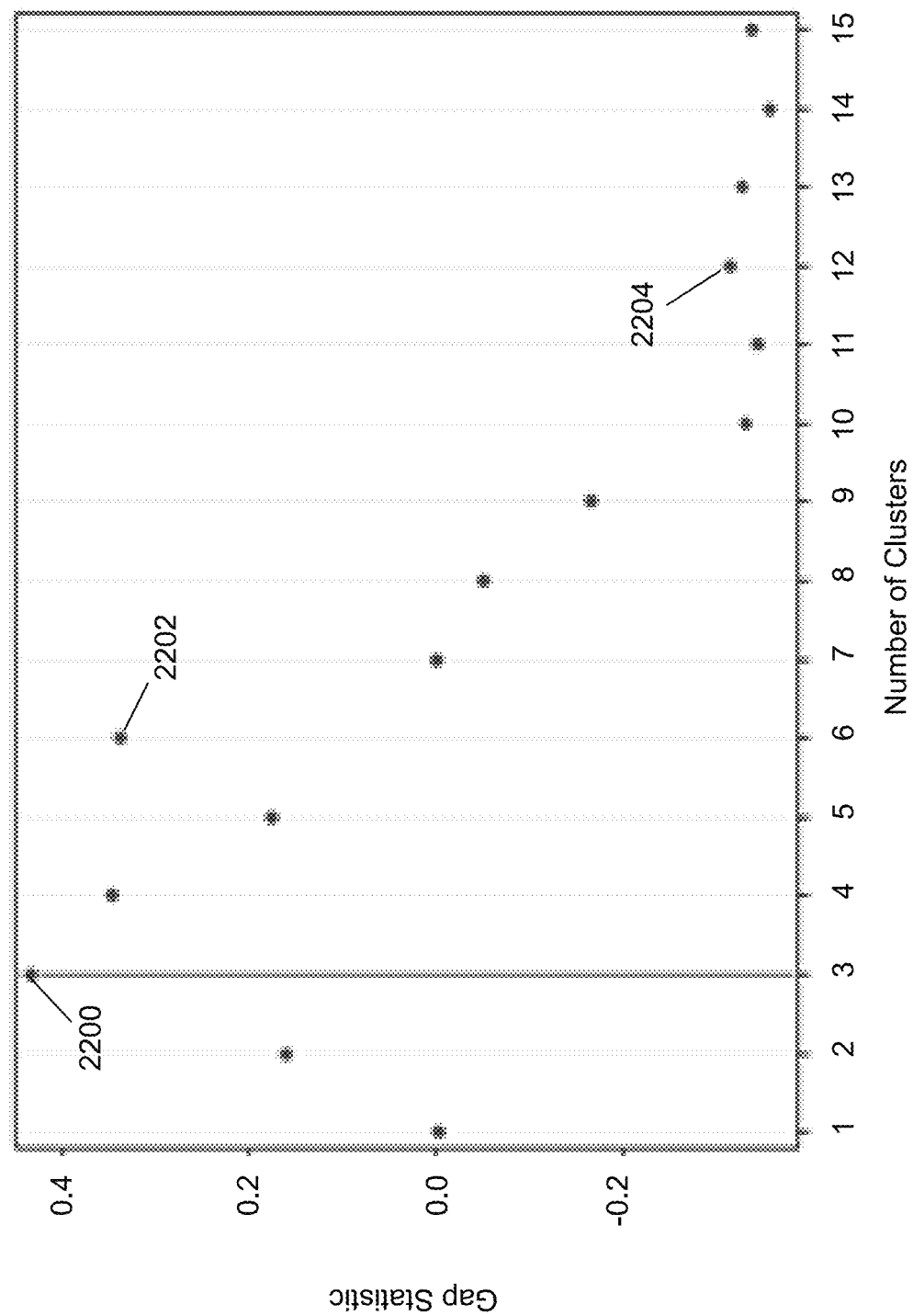
FIG. 22 is a graph showing a plot of a gap statistic value computed as a function of a number of clusters in accordance with an illustrative embodiment.

In operation 1028, an estimated best number of clusters for the received data is selected by comparing the gap statistic computed for each iteration of operation 1020. Referring to FIG. 22, a plot of a gap statistic value computed as a function of a number of clusters for a sample dataset is shown. A first local maxima for the gap statistic is indicated at a first data point 2200. A second local maxima for the gap statistic is indicated at a second data point 2202. A third local maxima for the gap statistic is indicated at a third data point 2204. First data point 2200 also has a maximum value for the computed gap statistic.

In an illustrative embodiment, the estimated best number of clusters may be selected as the first local maxima for a number of clusters greater than one. In another illustrative embodiment, the estimated best number of clusters may be selected as the local maxima that has a maximum value for the gap statistic for the number of clusters greater than one. Of course, if the gap statistic is normalized, the gap statistic for k=1 is not a local maxima. In the illustrative embodiment shown in FIG. 22, the estimated best number of clusters is three clusters based on the gap statistic of first data point 2200.

In yet another illustrative embodiment, the estimated best number of clusters may be selected as the defined number of clusters associated with a minimum defined number of clusters for which the computed gap statistic for that cluster is greater than the determined error gap of a subsequent cluster. The error gap is the difference between the computed gap statistic and the computed standard deviation as err(k)=gap(k)−sd(k).

In still another illustrative embodiment, a first number of clusters may be determined as the first local maxima for a number of clusters greater than one; a second number of clusters may be determined as the local maxima that has a maximum value for the gap statistic for the number of clusters greater than one; and a third number of clusters may be determined as the defined number of clusters associated with a minimum defined number of clusters for which the computed gap statistic for that cluster is greater than the determined error gap of the subsequent cluster. The estimated best number of clusters may be selected as the determined first number of clusters unless the determined second number of clusters equals the determined third number of clusters in which case the estimated best number of clusters is determined as the determined second number of clusters. Other rules for selecting among the first number of clusters, the second number of clusters, and third number of clusters may be defined.

Referring again to FIG. 9, processing may continue in an operation 916. In operation 916, cluster data for the determined best number of clusters is output. For example, cluster centroid locations for each of the determined best number of clusters and cluster assignments for the observation data points to the determined best number of clusters may be stored in computer-readable medium 108. The cluster centroid locations for each of the determined best number of clusters and cluster assignments for the observation data points to the determined best number of clusters define a set of clusters.

Referring again to FIG. 2, processing may continue in an operation 208. In operation 208, a determination is made concerning whether or not another determination of the number of clusters is to be performed. If another determination is to be performed, processing continues in operation 910 to determine another number of clusters. If another determination is not to be performed, processing continues in an operation 210. The determination may be based on a pre-defined number of determinations that may be defined similar to the number of Monte Carlo iterations in operation 904. 250 determinations may be a default value. In an alternative embodiment, instead of pre-determining a number of determinations, an evaluation may be made by a user to determine when the results appear satisfactory or stable based on a display of a line or curve showing a standard deviation or a dispersion of the number of clusters determined in each iteration of operation 910. Instead of an evaluation by a user, an automatic evaluation may be performed. For example, a pre-defined standard deviation threshold may be defined similar to the number of Monte Carlo iterations in operation 904. The calculated standard deviation may be compared to the pre-defined standard deviation threshold. When the calculated standard deviation is less than the pre-defined standard deviation threshold, no additional determination of the number of clusters is performed.

Figure 11:
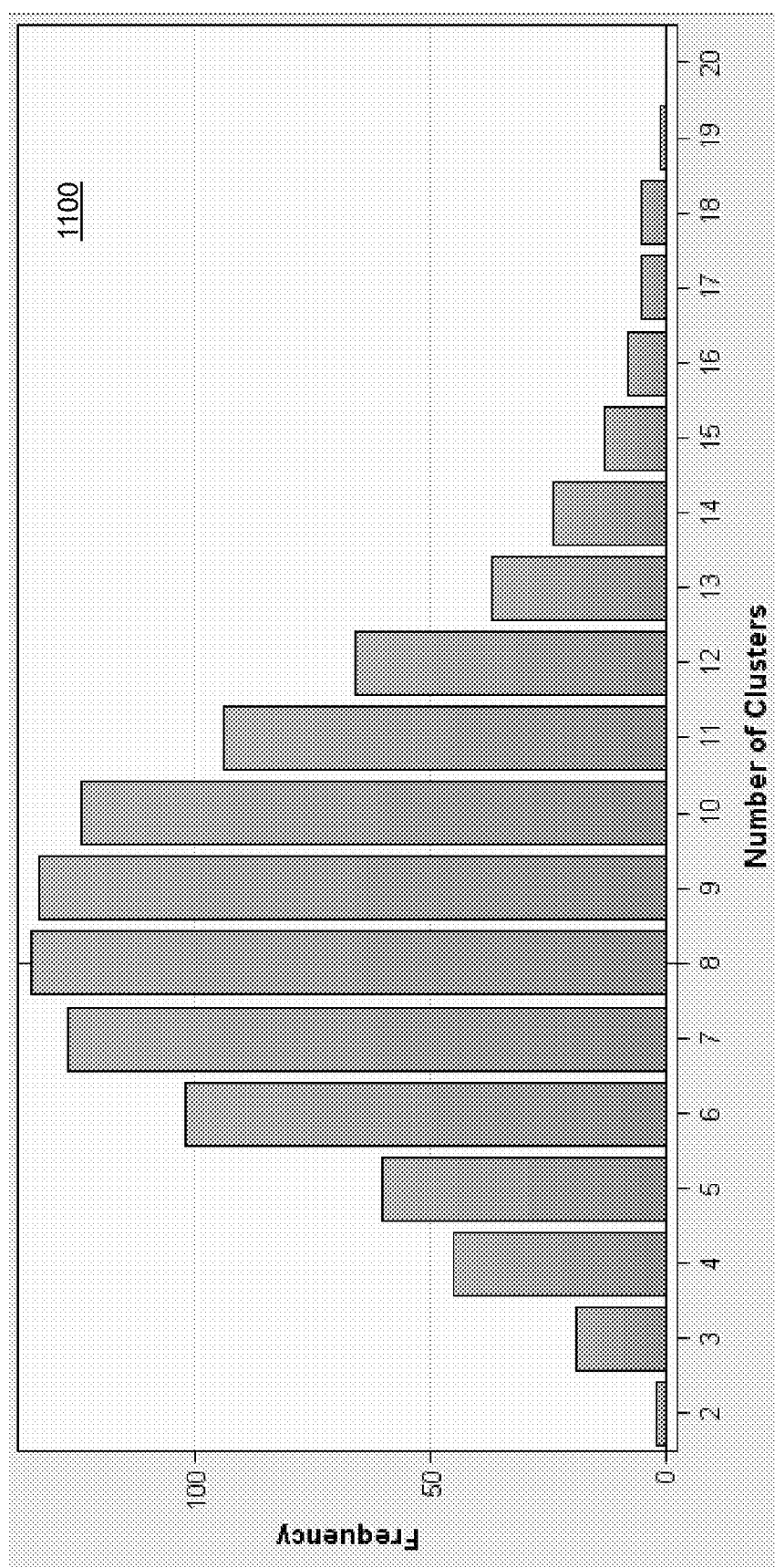
FIG. 11 depicts a histogram showing a distribution of a number of clusters that were repeatedly determined in accordance with an illustrative embodiment.

In operation 210, a number of clusters is selected from the plurality of determinations determined in each performance of operation 1028. The selected number of clusters has been cross-validated on random subsets of variables and considering a plurality of clustering solutions resulting in a global best estimate for the number of clusters. For illustration, referring to FIG. 11, a histogram 1100 showing the determined number of clusters from each execution of operation 1028 is presented. In the illustrative embodiment of FIG. 11, operation 1028 was performed 1000 times though a greater or a fewer number of performances may be performed in alternative embodiments. A maximum histogram value is indicated for eight clusters. If a maximum value is selected, the number of clusters is eight in the illustrative embodiment. Other methods may be used to select the number of clusters from histogram data for the number of clusters. For example, one or more criterion similar to that described in operation 1028 for selecting the best number of clusters may be used in operation 210.

Figure 12:
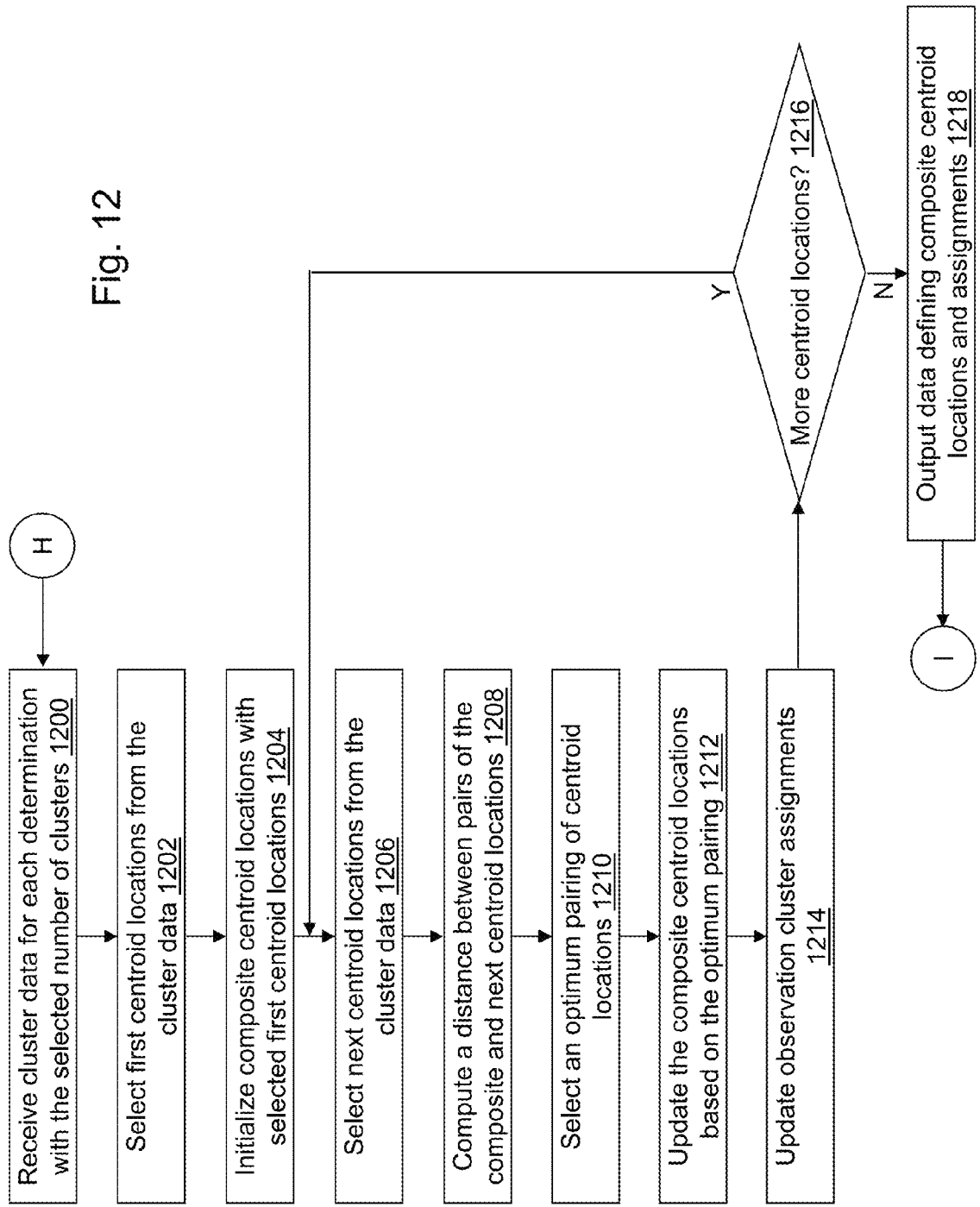
FIG. 12 depicts another flow diagram illustrating examples of operations performed by the data transformation device of FIG. 1 in accordance with an illustrative embodiment.

Referring again to FIG. 2, processing may continue in an operation 212. In operation 212, composite cluster centroid locations are determined to use to cluster observations. There is a different set of cluster centroid locations defined for each iteration of operation 1028 that resulted in the number of clusters selected in operation 210. Composite cluster centroid locations are determined to define a single set of cluster centroid locations. As an example, the composite cluster centroid locations may be determined using example operations described with reference to FIG. 12. The order of presentation of the operations of FIG. 12 is not intended to be limiting, and additional, fewer, or different operations may be performed depending on the embodiment.

In an operation 1200, cluster data for each iteration of operation 1028 that resulted in the number of clusters selected in operation 210 is received. For example, referring to FIG. 11, cluster data is received for the approximately 150 iterations of operation 1028 that resulted in eight clusters selected as the best number of clusters. For example, the cluster data may be received by reading the data stored in computer-readable medium 108 in operation 916.

In an operation 1202, first centroid locations are selected. For example, the centroid locations are selected from the cluster data associated with the first performance of operation 1028 that resulted in the number of clusters selected in operation 210. These centroid locations are selected as the first centroid locations.

In an operation 1204, composite centroid locations are initialized with the selected first centroid locations. For example, if the number of clusters selected in operation 210 is eight, the composite centroid locations will include eight centroid locations.

In an operation 1206, next centroid locations are selected. For example, the next centroid locations are selected from the cluster data associated with the next performance of operation 1028 that resulted in the number of clusters selected in operation 210. These centroid locations are selected as the next centroid locations.

In an operation 1208, a distance if computed between pairs of the composite centroid locations and the next centroid locations. For example a Euclidian distance may be computed between each pair of the composite centroid locations and the next centroid locations using a Euclidian distance computation algorithm, a Manhattan distance computation algorithm, a Minkowski distance computation algorithm, a Hamming distance computation algorithm, a Jacquard distance computation algorithm, etc. as understood by a person of skill in the art.

In an operation 1210, an optimum pairing between the composite centroid locations and the next centroid locations is selected. For example, a pairing associated with a minimum distance may be selected. Each composite centroid location is optimally paired to a single next centroid location. In an operation 1212, the composite centroid locations are updated based on the selected optimum pairing.

Figure 13:
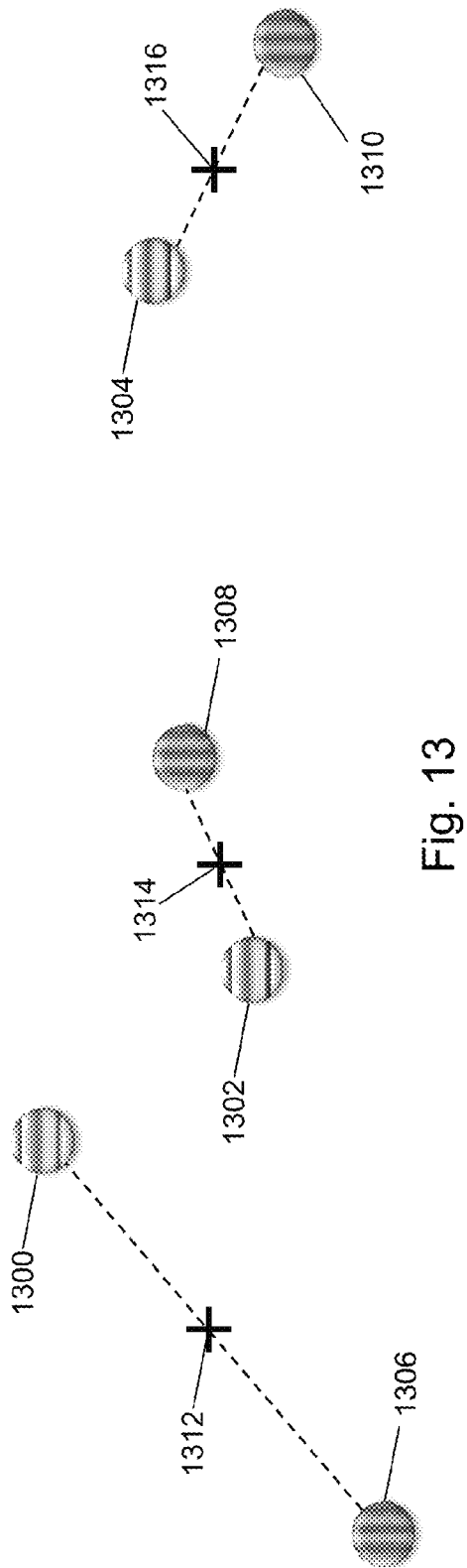
FIGS. 13 and 14 depict composite centroid location determinations in accordance with an illustrative embodiment.

For illustration, referring to FIG. 13, a first composite centroid location 1300, a second composite centroid location 1302, a third composite centroid location 1304, a first next centroid location 1306, a second next centroid location 1308, and a third next centroid location 1310 are shown in accordance with an illustrative embodiment that includes three clusters. In operation 1210, the optimum pairing was determined as first composite centroid location 1300 and first next centroid location 1306, second composite centroid location 1302 and second next centroid location 1308, and third composite centroid location 1304 and third next centroid location 1310 based on the distance computation. New composite centroid locations for each of first composite centroid location 1300, second composite centroid location 1302, and third composite centroid location 1304 are shown, respectively, at a first new centroid location 1312, a second new centroid location 1314, and a third new centroid location 1316. First new centroid location 1312, second new centroid location 1314, and third new centroid location 1316 may be computed by averaging coordinate locations between the paired centroid locations. In an alternative embodiment, a weight may be used to compute the new centroid locations. For example, a ratio of a number of observations in each cluster of the paired clusters may be used to determine a weight that is used to adjust the new centroid locations.

Referring again to FIG. 12, in an operation 1214, cluster assignments for the observations included in the cluster associated with each centroid location are updated to reflect the composite cluster to which the observation is assigned based on the optimum pairing. For example, cluster assignment for the observations associated with a first cluster having first next centroid location 1306 are updated to indicate first composite centroid location 1300. As an example, an index to the first cluster is changed to a new index associated with the first composite centroid location 1300 in the cluster data for the iteration of operation 1028 that resulted in first next centroid location 1306; an index to the second cluster is changed to a new index associated with the second composite centroid location 1302 in the cluster data for the iteration of operation 1028 that resulted in second next centroid location 1308; an index to the third cluster is changed to a new index associated with the third composite centroid location 1304 in the cluster data for the iteration of operation 1028 that resulted in third next centroid location 1310. In this manner, the cluster assignments for each iteration of operation 1028 that resulted in the number of clusters selected in operation 210 are updated to reflect the composite cluster assignment instead.

In an operation 1216, a determination is made concerning whether or not another iteration of operation 1028 resulted in the number of clusters selected in operation 210. If another iteration of operation 1028 did not result in the number of clusters selected in operation 210, processing continues in an operation 1218. If another iteration of operation 1028 resulted in the number of clusters selected in operation 210, processing continues in operation 1206 to select the next cluster data and update the composite centroid locations and observation cluster assignments.

Figure 14:
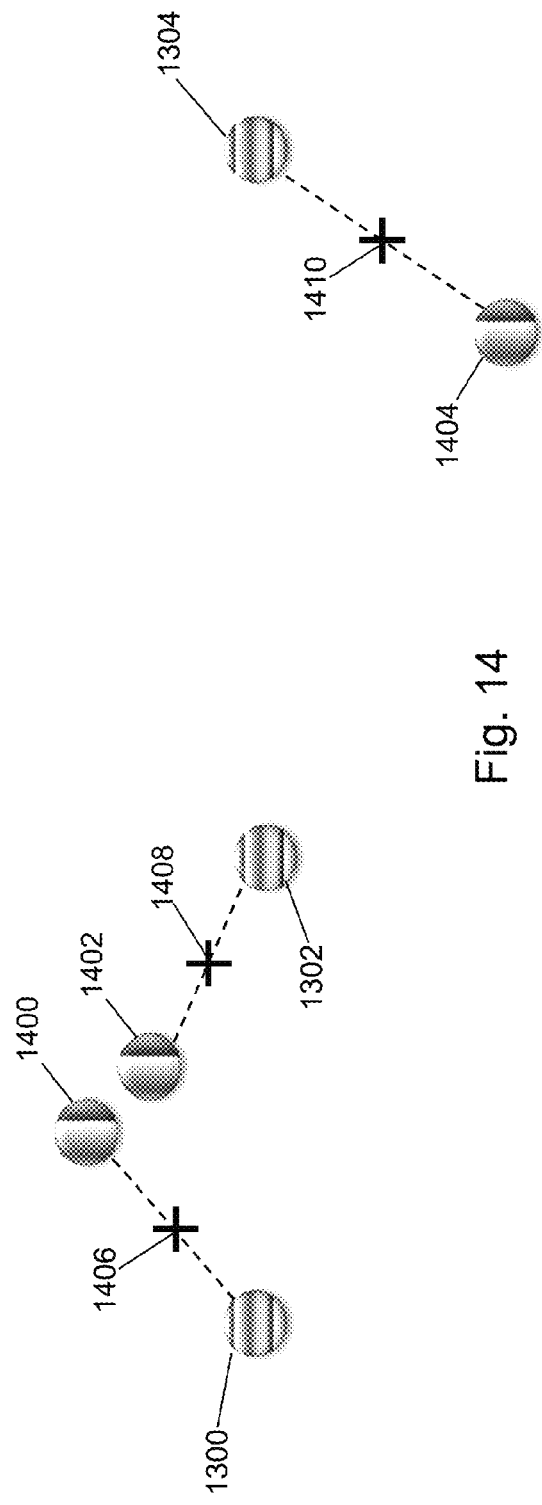

For example, referring to FIG. 14, a fourth next centroid location 1400, a fifth next centroid location 1402, and a sixth next centroid location 1404 are shown in accordance with an illustrative embodiment. In operation 1210, the optimum pairing was determined as first composite centroid location 1300 and fourth next centroid location 1400, second composite centroid location 1302 and fifth next centroid location 1402, and third composite centroid location 1304 and sixth next centroid location 1404 based on the distance computation. New composite centroid locations for each of first composite centroid location 1300, second composite centroid location 1302, and third composite centroid location 1304 are shown, respectively, at a fourth new centroid location 1406, a fifth new centroid location 1408, and a sixth new centroid location 1410.

In operation 1218, data defining the composite centroid locations and cluster assignments is output, for example, to computer-readable medium 108.

Figure 15:
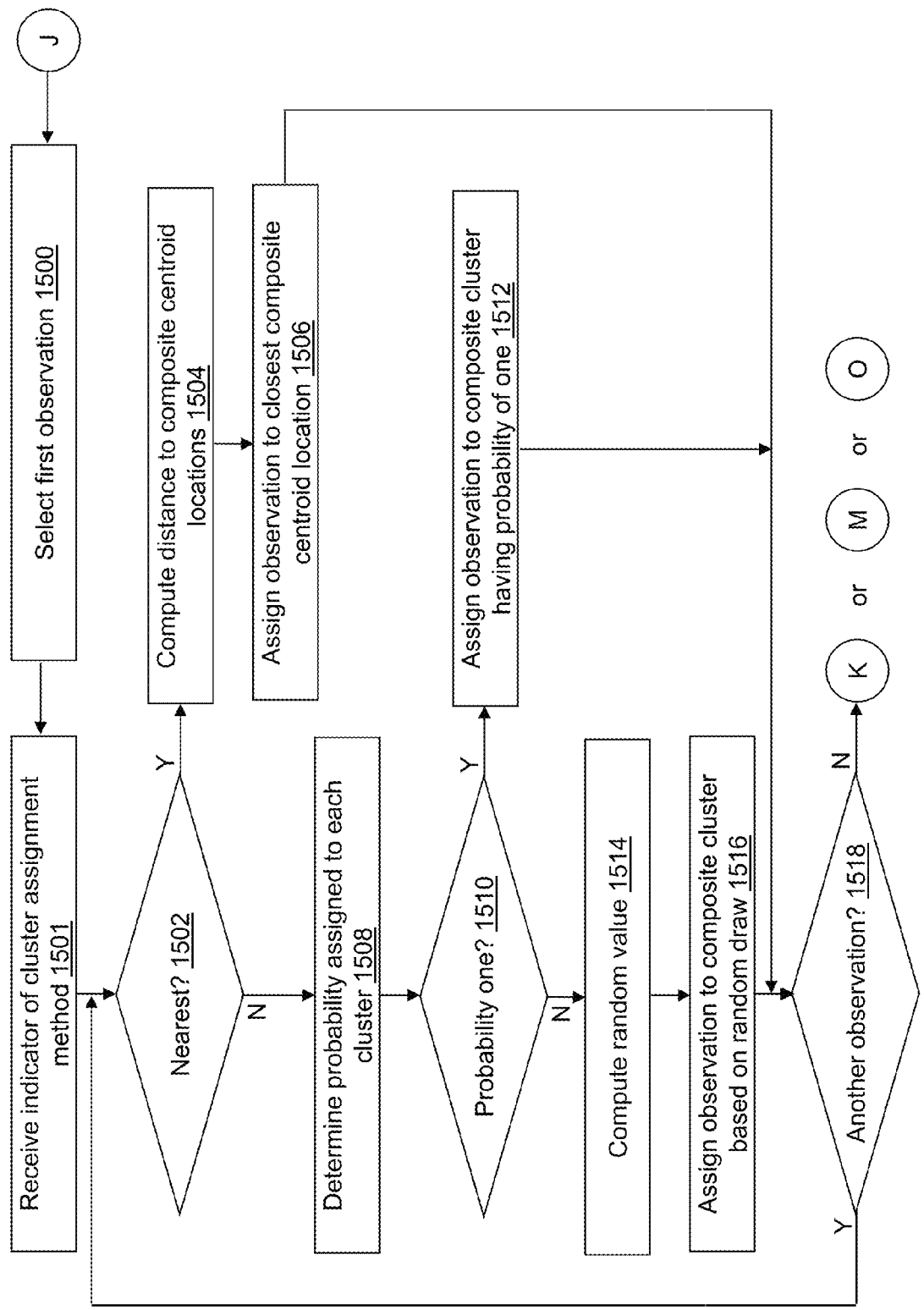
FIG. 15 depicts another flow diagram illustrating examples of operations performed by the data transformation device of FIG. 1 in accordance with an illustrative embodiment.

Referring again to FIG. 2, processing may continue in an operation 214. In operation 214, observations are assigned to the composite clusters. As an example, the observations are assigned to clusters associated with the composite centroid locations using example operations described with reference to FIG. 15. The order of presentation of the operations of FIG. 15 is not intended to be limiting, and additional, fewer, or different operations may be performed depending on the embodiment.

In an operation 1500, a first observation to assign to a composite cluster is selected, for example, from data matrix 124. All or a subset of the observations stored in data matrix 124 may be assigned to the composite clusters.

In an operation 1501, an eleventh indicator is received that indicates a cluster assignment algorithm. For example, the eleventh indicator indicates a name of a cluster assignment algorithm. The eleventh indicator may be received by cluster data application 122 after selection from a user interface window or after entry by a user into a user interface window. A default value for the cluster assignment algorithm to execute may further be stored, for example, in computer-readable medium 108. In an alternative embodiment, the cluster assignment algorithm may not be selectable.

In an operation 1502, a determination is made concerning whether or not a nearest cluster assignment algorithm is used based on the eleventh indicator or default value for the cluster assignment algorithm. If the nearest cluster assignment algorithm is used, processing continues in an operation 1504. If the nearest cluster assignment algorithm is not used, processing continues in an operation 1508.

In operation 1504, a distance is computed between the values of the selected decorrelated variables for the selected observation and each composite centroid location. In an operation 1506, the observation is assigned to the composite cluster associated with a minimum distance. Processing continues in an operation 1518.

In operation 1508, a probability of assigning the observation to each composite cluster is determined. Because the composite cluster assignment was updated in operation 1214 for each iteration of operation 1028 that resulted in the number of clusters selected in operation 210, a probability of assigning the observation to a specific composite cluster can be determined based on how many times a given observation was placed into the specific composite cluster. For example, if a given observation was placed into a specific composite cluster n times, the probability that the observation belongs to that composite cluster is n/r, where r is the number of iterations of operation 1028 that resulted in the number of clusters selected in operation 210. If the same observation was placed into another composite cluster m times, the probability of the observation belonging to the other composite cluster is m/r. If the same observation was placed into still another composite cluster p times, the probability of the observation belonging to the other composite cluster is p/r. Of course, if the observation was assigned to the same composite cluster each time, the probability is one for that same composite cluster and zero for the remaining composite clusters.

In an operation 1510, a determination is made concerning whether or not a probability is one for a specific composite cluster. For example, the probability is one if the assignment was consistently to the same composite cluster. If the probability is one for a specific composite cluster, processing continues in an operation 1512. If the probability is not one for a specific composite cluster, processing continues in an operation 1514. In operation 1512, the observation is assigned to the specific composite cluster having a probability of one.

In operation 1514, a random draw value is computed, for example, from a statistical distribution algorithm such as a uniform statistical distribution algorithm. In operation 1516, the observation is assigned to a composite cluster having a probability greater than zero based on the random draw value. For example, the probability values may be converted to consecutive values from zero to one by successively adding the computed probability to a previous value and selecting the composite cluster whose probability includes the random draw value. For illustration, Table I below shows the conversion to consecutive values.

TABLE I

| Composite cluster number | Probability | Consecutive probability value |
|---|---|---|
| 5 | 0.18 | 0.18 |
| 150 | 0.3 | 0.48 |
| 239 | 0.37 | 0.85 |
| 456 | 0.15 | 1 |

If the random draw value is 0.67, the observation is assigned to composite cluster number 239 because 0.67 is between 0.48 and 0.85.

As an alternative, operations 1510, 1512, 1514, and 1516 may not be performed. Instead, the observation may be assigned to the composite cluster having a highest probability. As another alternative, the observation is assigned to all of the composite clusters having a probability greater than zero.

In operation 1518, a determination is made concerning whether or not there is another observation to process. If there is another observation to process, processing continues in operation 1502. If there is not another observation to process, processing continues in optionally one of operations 216, 220, or 224 shown with reference to FIG. 2.

Referring again to FIG. 2, in operation 216, cluster data 126 is output that defines each composite cluster of the composite clusters. For each composite cluster, the associated composite centroid location may be output, for example, by storing in computer-readable medium 108. Additionally, the selected decorrelated variables may be stored, for example, in computer-readable medium 108. Further, a probability of assigning an observation to each composite cluster may be determined and output, for example, by storing in computer-readable medium 108. For example, a probability may be calculated for each composite cluster of the composite clusters based on a percentage of the observations assigned to each composite cluster in operation 214. Still further, a centroid location of each of the centroid locations assigned to each composite cluster of the composite clusters based on the optimum pairing in operation 1210 may be output, for example, by storing in computer-readable medium 108. Yet further, an observation cluster assignment table may be output, for example, by storing in computer-readable medium 108. For example, the observation cluster assignment table may include the probability of assigning the observation to each composite cluster with an index to the observation in data matrix 124. As another option, the observation cluster assignment table may be added to data matrix 124.

Figure 16:
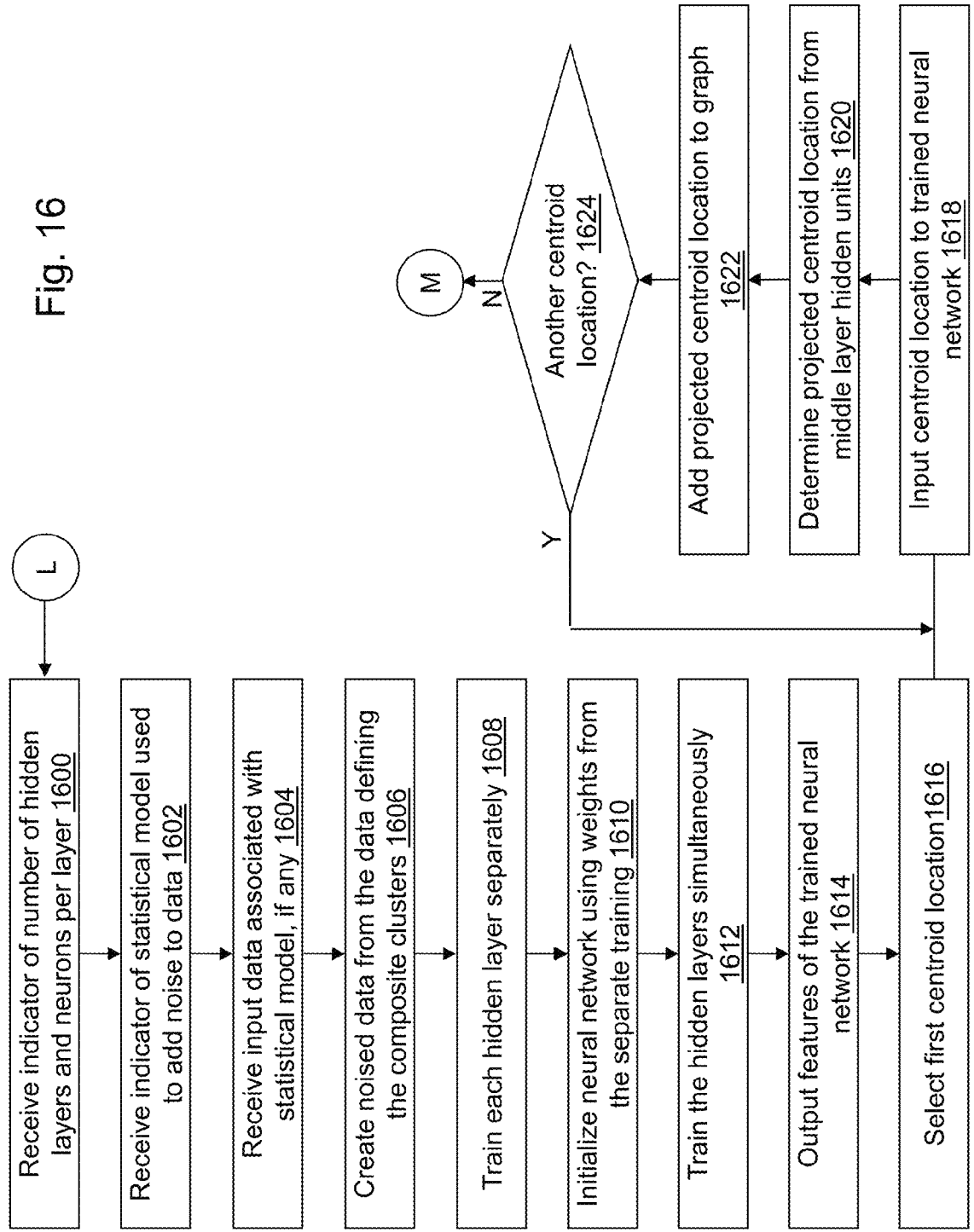
FIG. 16 depicts another flow diagram illustrating examples of operations performed by the data transformation device of FIG. 1 in accordance with an illustrative embodiment.

In an operation 218, a visualization of the composite clusters may be presented. As an example, the composite clusters may be visualized using example operations described with reference to FIG. 16. The order of presentation of the operations of FIG. 16 is not intended to be limiting, and additional, fewer, or different operations may be performed depending on the embodiment.

In an operation 1600, a twelfth indicator is received of a number of hidden layers and a number of neurons per layer for a multi-layer neural network. The twelfth indicator may be received by cluster data application 122 after a selection from a user interface window or after entry by a user into a user interface window. A default value for the number of hidden layers and a number of neurons per layer may further be stored, for example, in computer-readable medium 108. For example, a default may be five for the number of hidden layers with the 2nd and 4th layers including half the number of neurons as the 1st and 5th layers. In an alternative embodiment, the number of hidden layers and a number of neurons per layer may not be selectable. Because the hidden units defined by the middle layer of the multi-layer neural network define are used to visualize the composite clusters, the number of neurons in the middle layer typically may be two or three. For example with two neurons in the middle layer, a two-dimensional scatterplot of composite clusters can be used, and with three neurons in the middle layer, a three-dimensional scatterplot of composite clusters can be used.

Figure 23:
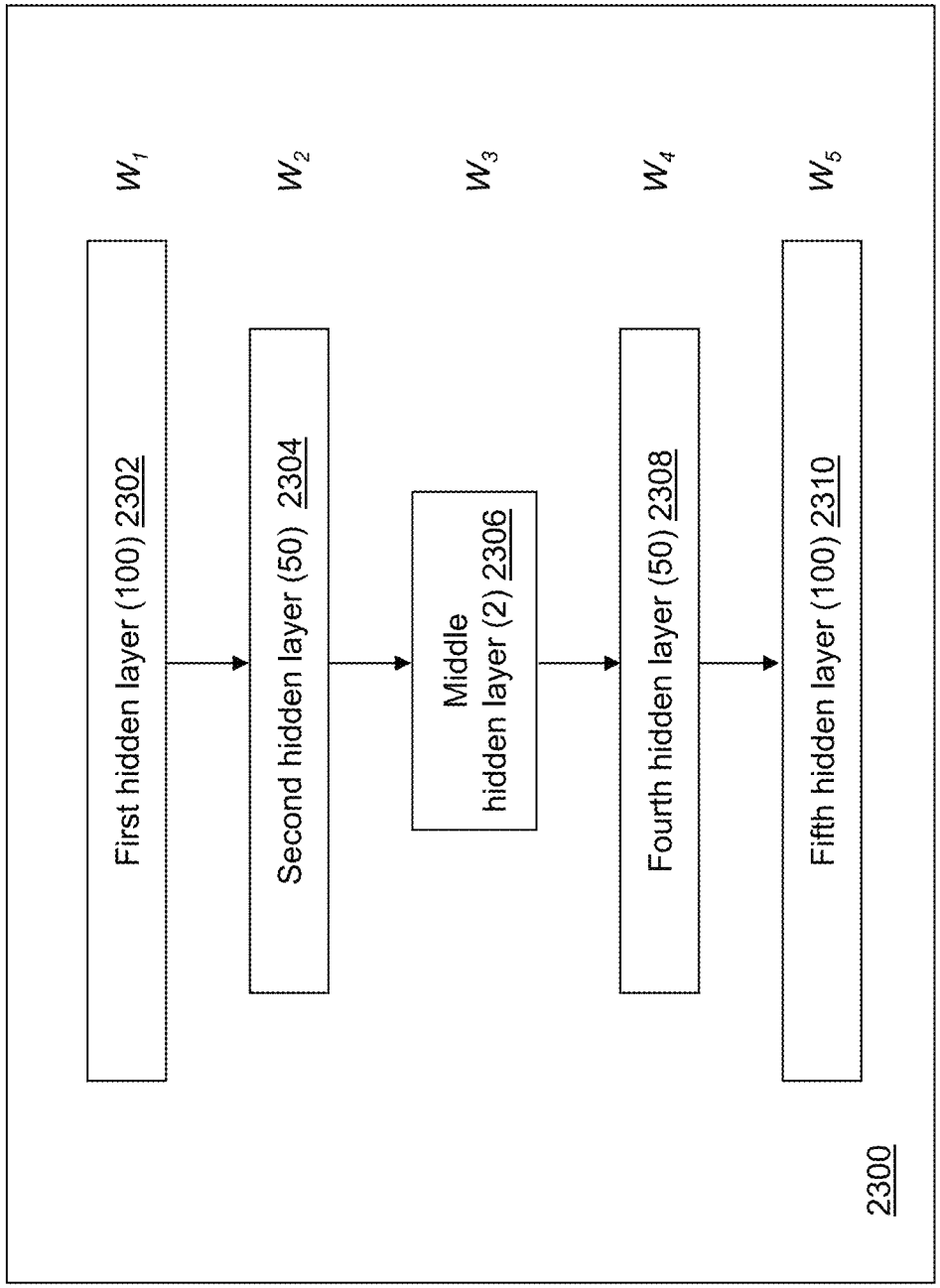
FIG. 23 depicts a neural network in accordance with an illustrative embodiment.

Referring to FIG. 23, a first neural network 2300 is shown for illustration. first neural network 2300 may include a first hidden layer 2302, a second hidden layer 2304, a middle hidden layer 2306, a fourth hidden layer 2308, and a fifth hidden layer 2310. The number of neurons in each layer are shown in parentheses. For example, as inputs, the number of layers may have been five with a number of neurons per layer defined as 100, 50, and 2. The neurons for the remaining layers may be based on the layers above the middle hidden layer 2306 in reverse order as understood by a person of skill in the art and illustrated in FIG. 23.

In an operation 1602, a thirteenth indicator is received of a statistical distribution algorithm to use to add noise to the data input to the neural network. For example, the thirteenth indicator indicates a name of a statistical distribution algorithm. The thirteenth indicator may be received by cluster data application 122 after selection from a user interface window or after entry by a user into a user interface window. A default value for the statistical distribution algorithm to execute may further be stored, for example, in computer-readable medium 108. In an alternative embodiment, the statistical distribution algorithm may not be selectable.

In an operation 1604, any input parameters used by the statistical distribution algorithm may be input. For example, after a user selects a statistical distribution algorithm, cluster data application 122 may present a user interface window that requests entry by a user of values associated with the input parameters used by the selected statistical distribution algorithm or presents default values for the input parameters used by the selected statistical distribution algorithm.

In an operation 1606, noised centroid location data is created from the data defining the composite clusters. For example, noise may be added to the centroid location of each of the centroid locations assigned to each composite cluster of the composite clusters based on the optimum pairing in operation 1210 by determining a random draw value from the statistical distribution algorithm as understood by a person of skill in the art.

In an operation 1608, each hidden layer of the neural network is trained separately as a single-layer neural network in a pretraining step as described, for example, in Hinton et al., *Reducing the Dimensionality of Data with Neural Networks*, Science, Vol. 313, Jul. 28, 2006, pp. 504-507. For example, the created noised data is input to the first hidden layer, which is trained to determine a weight(s); the output of the first hidden layer training is input to the second hidden layer, which is trained to determine a weight(s); and so on to the middle layer that has the fewest number of neurons. For example, referring again to FIG. 23, a first weight $W_1$ (or vector of weights) may be defined for first hidden layer 2302, a second weight $W_2$ (or vector of weights) may be defined for second hidden layer 2304, a third weight $W_3$ (or vector of weights) may be defined for middle hidden layer 2306, a fourth weight $W_4$ (or vector of weights) may be defined for fourth hidden layer 2308, and a fifth weight $W_4$ (or vector of weights) may be defined for fifth hidden layer 2310 in operation 1608.

Referring again to FIG. 16, in an operation 1610, the weights determined for each hidden layer in operation 1608 are used to initialize the entire multi-layer neural network. In an operation 1612, each hidden layer of the initialized multi-layer neural network is trained simultaneously using the created noised data as input to the first hidden layer. When a large number of inputs are used in conjunction with a much smaller number of hidden units, the features that are extracted as outputs of the middle hidden units are an optimal, nonlinear projection of the training examples onto a lower-dimensional space.

In an operation 1614, the output features defining the trained neural network are output. For example, the output features defining the trained neural network may be output by storing the output features in computer-readable medium 108.

In an operation 1616, a first centroid location is selected. For example, a first centroid location of the centroid locations assigned to the composite clusters may be read from computer-readable medium 108.

In an operation 1618, the selected centroid location is input to the trained neural network. In an operation 1620, a projected centroid location is determined by executing the trained neural network with the selected centroid location. The projected centroid location is the value of the hidden units from the middle hidden layer computed when executing the trained neural network.

Figure 24:
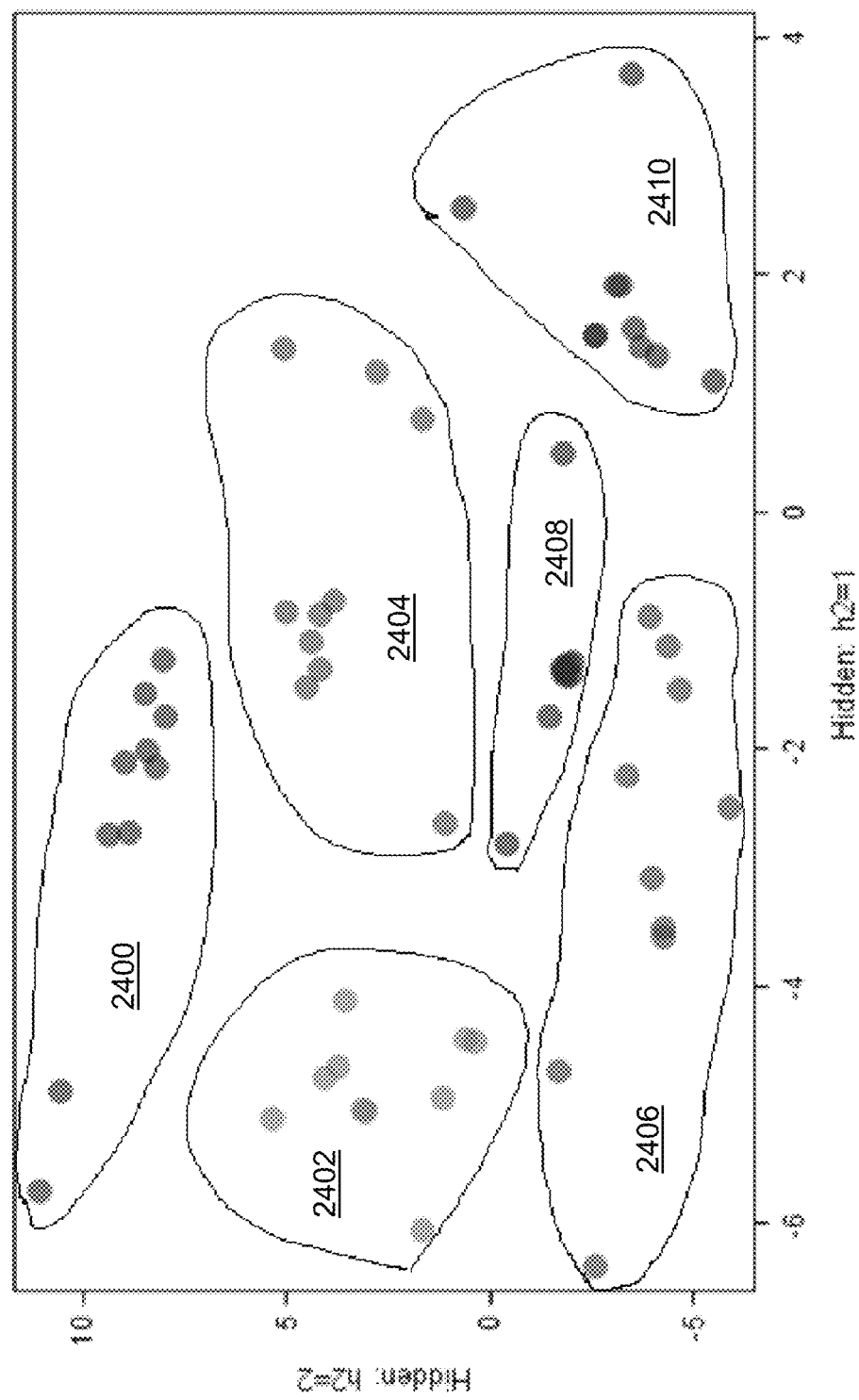
FIG. 24 is a graph of composite clusters in a coordinate reference frame defined using a neural network in accordance with an illustrative embodiment.

In an operation 1622, the determined projected centroid location is added to a graph such as a two-dimensional or a three-dimension graph. For example, when two neurons are selected for the middle layer, the centroid location for the members of each composite cluster can be plotted in two dimensions by extracting the features determined by the middle layer of the trained neural network in operation 1622. Referring to FIG. 24, six composite clusters, a first composite cluster 2400, a second composite cluster 2402, a third composite cluster 2404, a fourth composite cluster 2406, a fifth composite cluster 2408, and a sixth composite cluster 2410, are shown for illustration with the centroid location for each member of the respective composite cluster plotted using the values of the hidden units from the middle hidden layer. For each centroid location, a first value of the hidden unit for a first neuron of the two neurons is plotted on an x-axis, and a second value of the hidden unit for a second neuron of the two neurons is plotted on a y-axis. Of course, if three neurons are used for the middle layer, a third value of the hidden unit for a third neuron of the three neurons is plotted on a z-axis. The clusters are separate and easily identifiable providing an additional interpretability and visualization of the clusters.

In an operation 1624, a determination is made concerning whether or not there is another centroid location to process. For example, each centroid location assigned to the composite clusters may be plotted on the graph. If there is another centroid location to process, processing continues in operation 1618 with a next selected centroid location. If there is not another observation to process, processing continues in operation 220.

Referring again to FIG. 2, in operation 220, a fourteenth indicator is received indicating new data to cluster with the composite clusters. For example, the fourteenth indicator indicates a location of a second data matrix. Similar to the first indicator, the fourteenth indicator may further indicate that only a portion of the data stored in the second data matrix be clustered as discussed previously. All or a subset of the observations may be assigned to the composite clusters.

Figure 17:
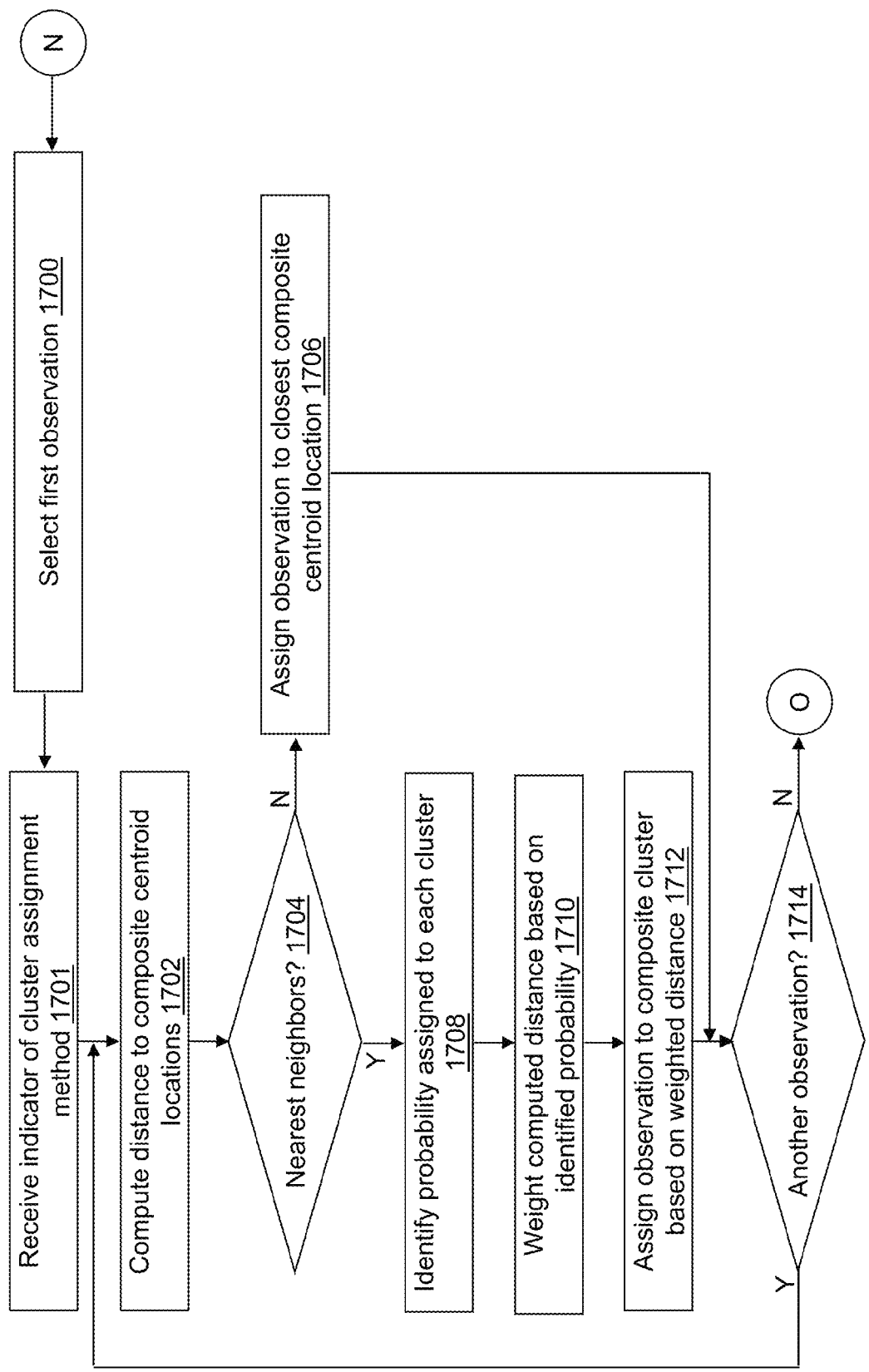
FIG. 17 depicts another flow diagram illustrating examples of operations performed by the data transformation device of FIG. 1 in accordance with an illustrative embodiment.

In an operation 222, the new observations are assigned to the composite clusters based on the composite centroid locations. As an example, the observations are assigned to clusters associated with the composite centroid locations using example operations described with reference to FIG. 17. The order of presentation of the operations of FIG. 17 is not intended to be limiting, and additional, fewer, or different operations may be performed depending on the embodiment.

In an operation 1700, a first observation to assign to a composite cluster is selected, for example, from the second data matrix.

Similar to operation 1501, in an operation 1701, a fifteenth indicator is received that indicates a cluster assignment algorithm.

Similar to operation 1504, in an operation 1702, a distance is computed between the values of the selected decorrelated variables for the selected observation and each composite centroid location.

In an operation 1704, a determination is made concerning whether or not a nearest neighbors cluster assignment algorithm is used based on the thirteenth indicator or the default value for the cluster assignment algorithm. If the nearest neighbors assignment method is used, processing continues in an operation 1708. If the nearest neighbors cluster assignment algorithm is not used, processing continues in an operation 1706.

Similar to operation 1506, in operation 1706, the observation is assigned to the composite cluster associated with a minimum distance. Processing continues in an operation 1714.

In operation 1708, a probability of assigning the observation to each composite cluster is determined. For example, a probability may be calculated for each composite cluster of the composite clusters based on the percentage of observations assigned to each cluster in operation 214. As another option, the probability may be determined by reading the probability data stored in computer-readable medium 108 in operation 216.

In an operation 1710, the probability calculated for each composite cluster of the composite clusters is applied as a weight to the distance to each composite cluster computed in operation 1702 to compute a weighted distance to each composite centroid location.

In an operation 1712, the observation is assigned to the composite cluster associated with a minimum weighted distance to the composite centroid location.

Similar to operation 1518, in operation 1714, a determination is made concerning whether or not there is another observation to process. If there is another observation to process, processing continues in operation 1702. If there is not another observation to process, processing continues in operation 224.

Referring again to FIG. 2, in operation 224, the cluster data determinations for the observations in either of data matrix 124 or the second data matrix may be used for further exploratory analysis of the data as understood by a person of skill in the art.

Figure 18:
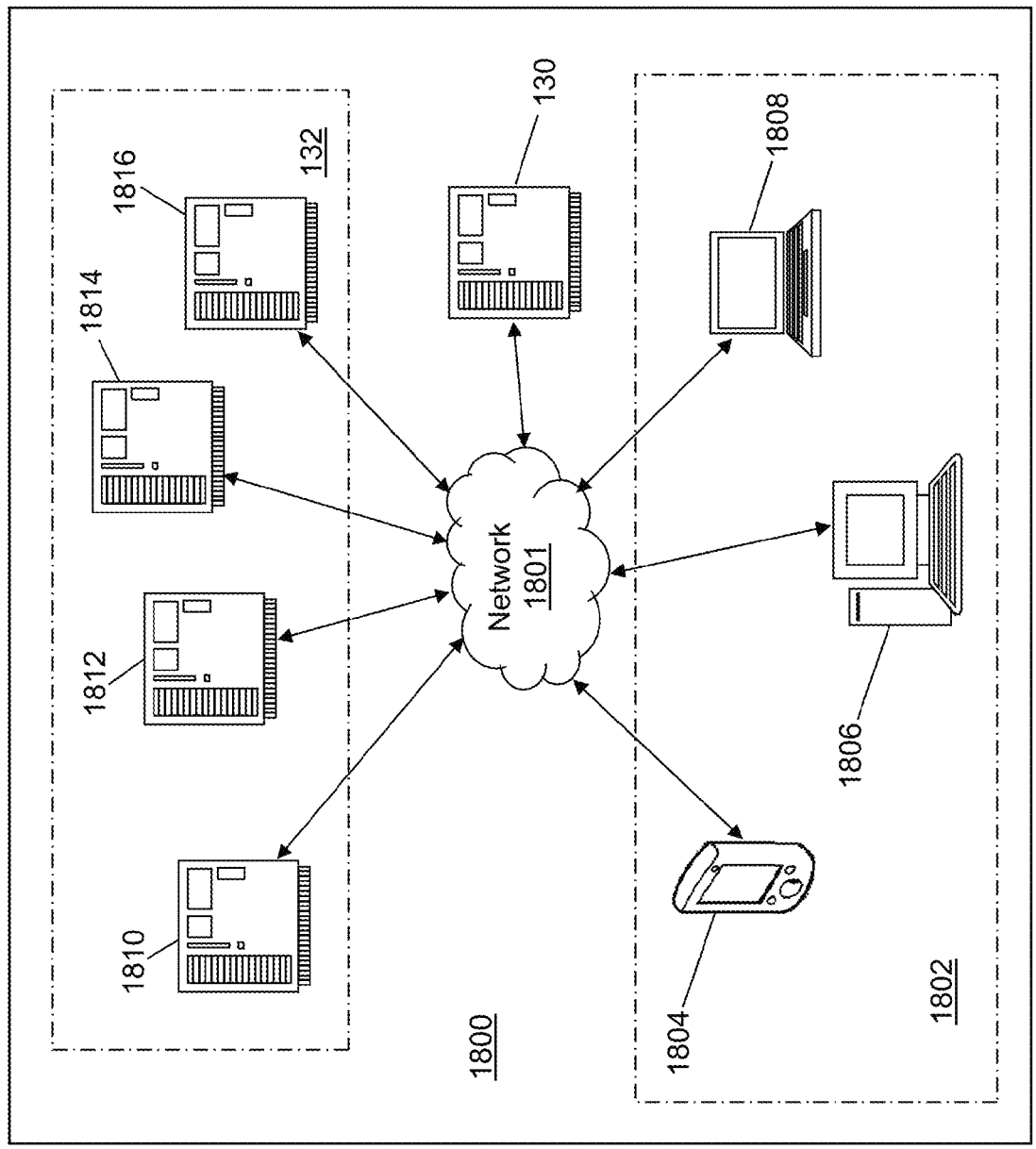
FIG. 18 depicts a block diagram of a cluster determination system in accordance with an illustrative embodiment.

Referring to FIG. 18, a block diagram of a cluster determination system 1800 is shown in accordance with an illustrative embodiment. In an illustrative embodiment, cluster determination system 1800 may include distributed systems 132, data transformation systems 1802, distributed control device 130, and a network 1801. Distributed systems 132 store distributed data. Data transformation systems 1802 access data distributed to the distributed systems 132. Distributed control device 130 coordinates and controls access by data transformation systems 1802 to the data stored by the distributed systems 132. One or more components of cluster determination system 1800 may support multithreading, as understood by a person of skill in the art.

The components of cluster determination system 1800 may be located in a single room or adjacent rooms, in a single facility, and/or may be distributed geographically from one another. Each of distributed systems 132, data transformation systems 1802, and distributed control device 130 may be composed of one or more discrete devices.

Network 1801 may include one or more networks of the same or different types. Network 1801 can be any type of wired and/or wireless public or private network including a cellular network, a local area network, a wide area network such as the Internet, etc. Network 1801 further may comprise sub-networks and include any number of devices.

Data transformation systems 1802 can include any number and type of computing devices that may be organized into subnets. Data transformation device 100 is an example computing device of data transformation systems 1802. The computing devices of data transformation systems 1802 send and receive communications through network 1801 to/from another of the one or more computing devices of data transformation systems 1802, to/from distributed systems 132, and/or to/from distributed control device 130. The one or more computing devices of data transformation systems 1802 may include computers of any form factor such as a smart phone 1804, a desktop 1806, a laptop 1808, a personal digital assistant, an integrated messaging device, a tablet computer, etc. The one or more computing devices of data transformation systems 1802 may communicate using various transmission media that may be wired and/or wireless as understood by those skilled in the art.

For illustration, FIG. 18 represents distributed systems 132 with a first server computer 1810, a second server computer 1812, a third server computer 1814, and a fourth server computer 1816. Distributed systems 132 can include any number and form factor of computing devices that may be organized into subnets. The computing devices of distributed systems 132 send and receive communications through network 1801 to/from another of the one or more computing devices of distributed systems 132, to/from distributed control device 130, and/or to/from data transformation systems 1802. The one or more computing devices of distributed systems 132 may communicate using various transmission media that may be wired and/or wireless as understood by those skilled in the art.

In the illustrative embodiment, distributed control device 130 is represented as a server computing device though distributed control device 130 may include one or more computing devices of any form factor that may be organized into subnets. Distributed control device 130 sends and receives communications through network 1801 to/from distributed systems 132 and/or to/from data transformation systems 1802. Distributed control device 130 may communicate using various transmission media that may be wired and/or wireless as understood by those skilled in the art.

Cluster determination system 1800 may be implemented as a grid of computers with each computing device of distributed systems 132 storing a portion of data matrix 124 in a cube, as understood by a person of skill in the art. Cluster determination system 1800 may be implemented as a multi-node Hadoop® cluster, as understood by a person of skill in the art. Cluster determination system 1800 may use cloud computing technologies, which support on-demand network access to a shared pool of configurable computing resources (e.g., networks, servers, storage, applications and services) that can be rapidly provisioned and released with minimal management effort or service provider interaction. Cluster determination system 1800 may use SAS® High Performance Analytics server. Cluster determination system 1800 may use the SAS LASR™ Analytic Server to deliver statistical modeling and machine learning capabilities in a highly interactive programming environment, which may enable multiple users to concurrently manage data, transform variables, perform exploratory analysis, and build and compare models. Cluster determination system 1800 may use SAS In-Memory Statistics for Hadoop® to read big data once and analyze it several times by persisting it in-memory. Some systems may be of other types and configurations.

Figure 19:
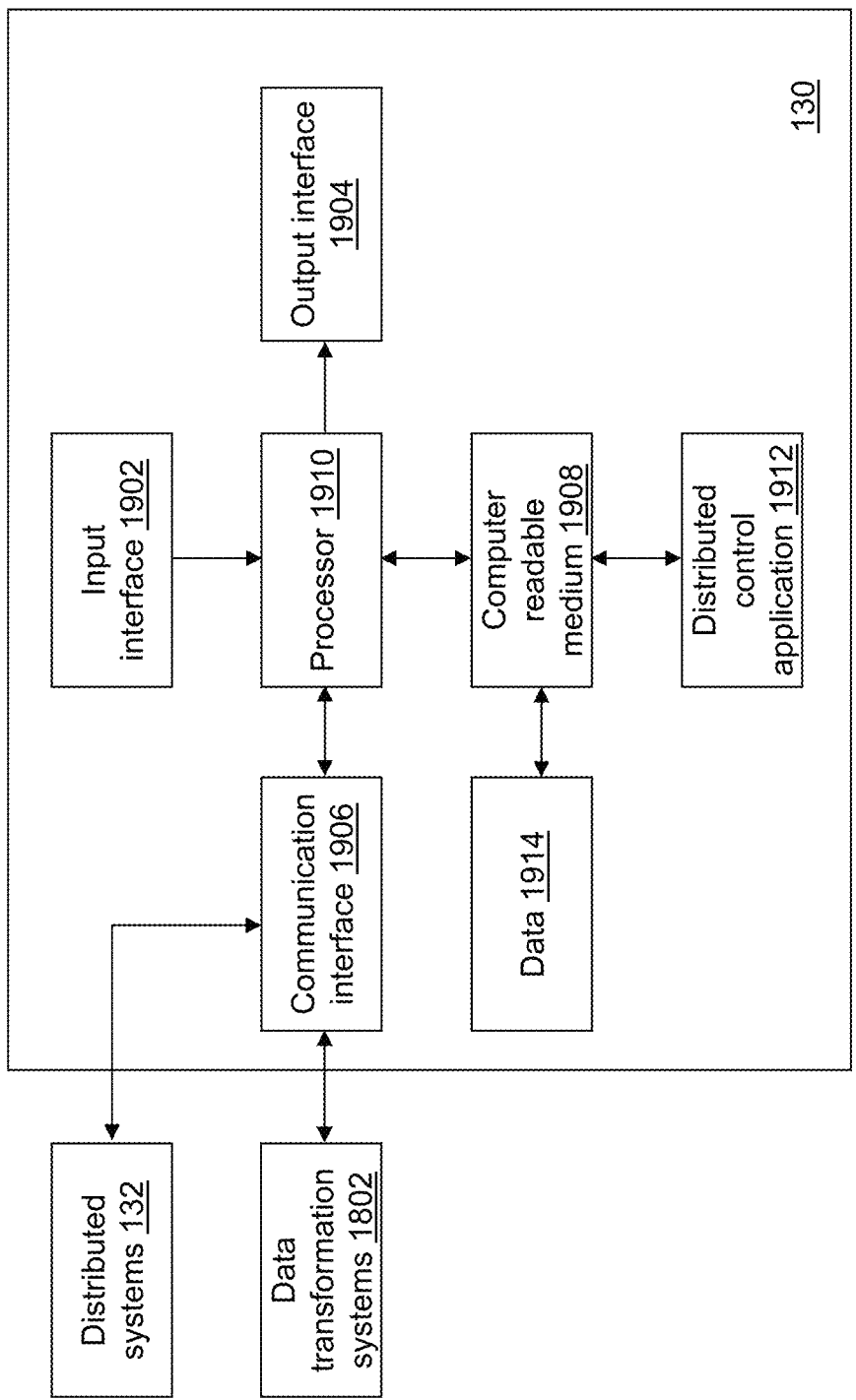
FIG. 19 depicts a block diagram of a distributed control device of the cluster determination system of FIG. 18 in accordance with an illustrative embodiment.

Referring to FIG. 19, a block diagram of distributed control device 130 is shown in accordance with an example embodiment. Distributed control device 130 may include a second input interface 1902, a second output interface 1904, a second communication interface 1906, a second non-transitory computer-readable medium 1908, a second processor 1910, a distributed control application 1912, and second data 1914. Fewer, different, and additional components may be incorporated into distributed control device 130.

Second input interface 1902 provides the same or similar functionality as that described with reference to input interface 102 of data transformation device 100 though referring to distributed control device 130. Second output interface 1904 provides the same or similar functionality as that described with reference to output interface 104 of data transformation device 100 though referring to distributed control device 130. Second communication interface 1906 provides the same or similar functionality as that described with reference to communication interface 106 of data transformation device 100 though referring to distributed control device 130. Data and messages may be transferred between distributed control device 130 and distributed systems 132 and/or data transformation systems 1802 using second communication interface 1906. Second computer-readable medium 1908 provides the same or similar functionality as that described with reference to computer-readable medium 108 of data transformation device 100 though referring to distributed control device 130. Second processor 1910 provides the same or similar functionality as that described with reference to processor 110 of data transformation device 100 though referring to distributed control device 130.

Distributed control application 1912 performs operations associated with controlling access to the distributed data, with performing one or more operations described with reference to FIGS. 2, 3, 9, 10, 12, and 15-17, and/or with instructing distributed systems 132 to perform one or more operations described with reference to FIGS. 2, 3, 9, 10, 12, and 15-17.

Some or all of the operations described herein may be embodied in distributed control application 1912. The operations may be implemented using hardware, firmware, software, or any combination of these methods. Referring to the example embodiment of FIG. 19, distributed control application 1912 is implemented in software (comprised of computer-readable and/or computer-executable instructions) stored in second computer-readable medium 1908 and accessible by second processor 1910 for execution of the instructions that embody the operations of distributed control application 1912. Distributed control application 1912 may be written using one or more programming languages, assembly languages, scripting languages, etc. Distributed control application 1912 may be implemented as a Web application.

Data 1914 may include data used by distributed control application 1912 in support of clustering data in data matrix 124.

Figure 20:
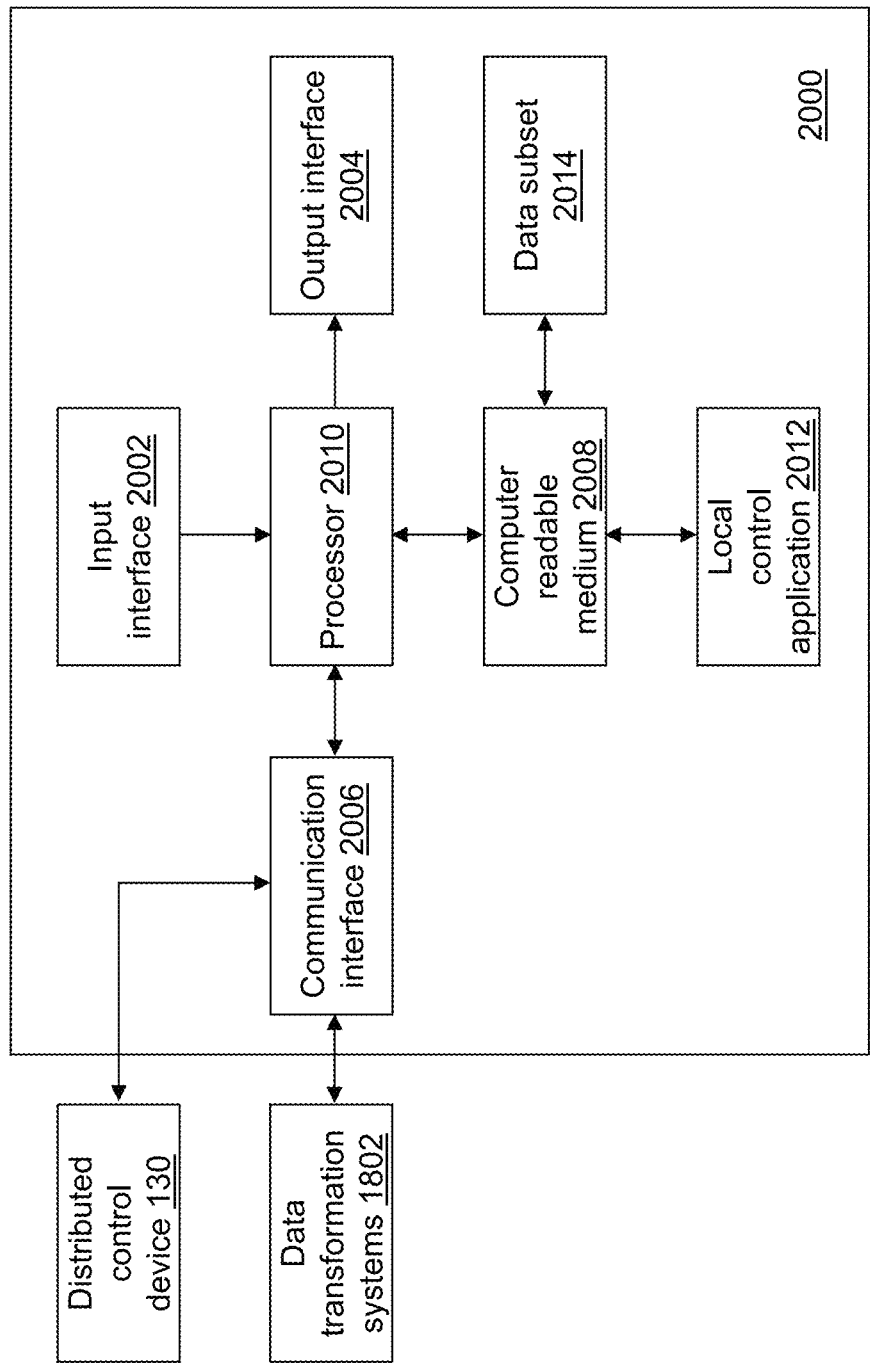
FIG. 20 depicts a block diagram of a data node device of the cluster determination system of FIG. 18 in accordance with an illustrative embodiment.

Referring to FIG. 20, a block diagram of a data node device 2000 is shown in accordance with an illustrative embodiment. Data node device 2000 is an example computing device of distributed systems 132. Data node device 2000 may include a third input interface 2002, a third output interface 2004, a third communication interface 2006, a third non-transitory computer-readable medium 2008, a third processor 2010, a local control application 2012, and a data subset 2014. Fewer, different, and additional components may be incorporated into data node device 2000.

Third input interface 2002 provides the same or similar functionality as that described with reference to input interface 102 of data transformation device 100 though referring to data node device 2000. Third output interface 2004 provides the same or similar functionality as that described with reference to output interface 104 of data transformation device 100 though referring to data node device 2000. Third communication interface 2006 provides the same or similar functionality as that described with reference to communication interface 106 of data transformation device 100 though referring to data node device 2000. Data and messages may be transferred between data node device 2000 and distributed control device 130 and/or data transformation systems 1802 using third communication interface 2006. Third computer-readable medium 2008 provides the same or similar functionality as that described with reference to computer-readable medium 108 of data transformation device 100 though referring to data node device 2000. Third processor 2010 provides the same or similar functionality as that described with reference to processor 110 of data transformation device 100 though referring to data node device 2000.

Local control application 2012 performs operations associated with controlling access to the data stored in data subset 2014 and/or with executing one or more operations described with reference to FIGS. 2, 3, 9, 10, 12, and 15-17. Some or all of the operations described herein may be embodied in local control application 2012. The operations may be implemented using hardware, firmware, software, or any combination of these methods. Referring to the example embodiment of FIG. 20, local control application 2012 is implemented in software (comprised of computer-readable and/or computer-executable instructions) stored in third computer-readable medium 2008 and accessible by third processor 2010 for execution of the instructions that embody the operations of local control application 2012. Local control application 2012 may be written using one or more programming languages, assembly languages, scripting languages, etc. Local control application 2012 may be implemented as a Web application.

Data subset 2014 stores a portion of the data distributed across distributed systems 132 with each computing device of the distributed systems 132 storing a different portion of the data. Distributed control device 130 further may store a portion of the data.

A user may execute cluster data application 122 that interacts with distributed control application 1912 by requesting that distributed control device 130 perform one or more operations described with reference to FIGS. 2, 3, 9, 10, 12, and 15-17. Distributed control application 1912 triggers processing by local control application 2012 executing at each node device of the distributed systems 132 to perform one or more operations described with reference to FIGS. 2, 3, 9, 10, 12, and 15-17. Any number of different users may be accessing the data at any given time.

Various levels of integration between the components of cluster determination system 1800 may be implemented without limitation as understood by a person of skill in the art. For example, local control application 2012 and distributed control application 1912 may be the same or different applications or part of an integrated, distributed application supporting some or all of the same or additional types of functionality as described herein. As another example, cluster data application 122 and distributed control application 1912 may be the same or different applications or part of an integrated, distributed application supporting some or all of the same or additional types of functionality as described herein.

The various operations described with reference to FIGS. 2, 3, 9, 10, 12, and 15-17 provide a process for automatically generating interpretable segmentation of raw data. A raw dataset may be cleaned and preprocessed, relevant variables selected, and observations grouped into clusters, all in automatic fashion and in an unsupervised setting that is in the absence of target variables. Example application areas include market segmentation, recommendation systems, monitoring equipment or conditions with sensors, image segmentation, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive data that includes a plurality of observations with a plurality of data points defined for each observation, wherein each data point of the plurality of data points is associated with a variable to define a plurality of variables;

repeatedly select a number of clusters into which to segment the received data by repeatedly executing a clustering algorithm with the received data;

define a plurality of sets of clusters based on the repeated execution of the clustering algorithm that resulted in the selected number of clusters;

define a plurality of composite clusters based on the defined plurality of sets of clusters; and assign the plurality of observations to the defined plurality of composite clusters using the plurality of data points defined for each observation.

2. The computer-readable medium of claim 1, wherein selecting the number of clusters comprises:

defining a test number of clusters to create;

(a) determining centroid locations for the defined test number of clusters using the clustering algorithm and the received data to define test clusters;

(b) creating a reference distribution that includes a plurality of reference data points, wherein the plurality of reference data points are within a boundary defined for the received data;

(c) determining second centroid locations for the defined test number of clusters using the clustering algorithm and the created reference distribution to define second test clusters;

(d) computing a first residual sum of squares for the defined test clusters;

(e) computing a second residual sum of squares for the defined second test clusters;

(f) computing a gap statistic for the defined test number of clusters based on a comparison between the computed first residual sum of squares and the computed second residual sum of squares;

(g) repeating (a) to (f) with a next test number of clusters to create as the defined test number of clusters;

determining an estimated best number of clusters for the received data by comparing the gap statistic computed for each iteration of (d); and selecting the number of clusters as the determined estimated best number of clusters.

3. The computer-readable medium of claim 2, wherein the boundary includes a cluster boundary for each of the defined test clusters and the plurality of reference data points are within the cluster boundary of at least one cluster of the defined test clusters.

4. The computer-readable medium of claim 2, wherein (b) and (c) are repeated a plurality of times.

5. The computer-readable medium of claim 2, wherein the test number of clusters to create is defined as a minimum number of clusters in a range of numbers of clusters to evaluate, and the next number of clusters is defined in (g) by incrementing the defined test number of clusters for each iteration of (g).

6. The computer-readable medium of claim 5, wherein (g) is repeated until the next number of clusters is greater than a maximum number of clusters in the range of numbers of clusters to evaluate.

7. The computer-readable medium of claim 2, wherein the estimated best number of clusters is determined as the defined number of clusters associated with a maximum value of the computed gap statistic or with a first local maxima value of the computed gap statistic.

8. The computer-readable medium of claim 1, wherein repeatedly selecting the number of clusters comprises:

randomly selecting a first subset of the plurality of variables;

selecting a first number of clusters into which to segment the received data by repeatedly executing the clustering algorithm with the received data using only the data points associated with the randomly selected first subset of the plurality of variables;

randomly selecting a second subset of the plurality of variables that is different from the first subset of the plurality of variables; and selecting a second number of clusters into which to segment the received data by repeatedly executing the clustering algorithm with the received data using only the data points associated with the randomly selected second subset of the plurality of variables.

9. The computer-readable medium of claim 8, wherein the random selection of the second subset of the plurality of variables and the selection of the second number of clusters is repeated a predefined number of times.

10. The computer-readable medium of claim 9, wherein the number of clusters is selected from the selected first number of clusters and the repeated selections of the second number of clusters.

11. The computer-readable medium of claim 1, wherein the computer-readable instructions further cause the computing device to select a plurality of decorrelated variables from the plurality of variables.

12. The computer-readable medium of claim 11, wherein selecting the plurality of decorrelated variables comprises:
computing a correlation value between each of the plurality of variables to define a correlation matrix;
comparing a binary threshold value to each correlation value to define a binary similarity matrix from the defined correlation matrix;
defining an undirected graph comprising a subgraph that includes one or more connected nodes, wherein the undirected graph is defined based on the defined binary similarity matrix, wherein the undirected graph stores connectivity information for the plurality of variables, wherein each node of the subgraph is pairwise associated with a variable of the plurality of variables;
selecting a least connected node from the defined undirected graph based on the connectivity information;
removing the selected least connected node from the undirected graph; and
outputting variables pairwise associated with remaining nodes of the undirected graph as the selected decorrelated variables when a stop criterion is satisfied.

13. The computer-readable medium of claim 12, wherein selecting the least connected node and removing the selected least connected node are repeated a plurality of times.

14. The computer-readable medium of claim 12, wherein the least connected node is selected randomly from a plurality of least connected nodes.

15. The computer-readable medium of claim 14, wherein the random selection comprises comparing a randomly determined value to a predefined drop percentage value.

16. The computer-readable medium of claim 12, wherein the connectivity information is updated after the selected least connected node is removed.

17. The computer-readable medium of claim 16, wherein selecting the least connected node and removing the selected least connected node are repeated after updating the connectivity information.

18. The computer-readable medium of claim 12, wherein the connectivity information comprises a connectivity counter value defined for each node in the undirected graph, wherein the connectivity counter value indicates a number of connections between the respective node and the remaining nodes.

19. The computer-readable medium of claim 12, wherein the stop criterion is satisfied when the number of remaining nodes equals a predefined minimum number of nodes.

20. The computer-readable medium of claim 12, wherein the stop criterion is satisfied when the number of remaining nodes equals a predefined percentage of one or more connected nodes included in the defined undirected graph.

21. The computer-readable medium of claim 12, wherein the defined undirected graph includes a plurality of subgraphs, and the stop criterion is satisfied when the plurality of subgraphs each include a single node.

22. The computer-readable medium of claim 1, wherein defining the plurality of composite clusters based on the defined plurality of sets of clusters comprises:
initializing composite cluster centroid locations for each composite cluster of the composite clusters pairwise with cluster centroid locations of a first set of clusters of the defined plurality of sets of clusters;
selecting a second set of clusters of the defined plurality of sets of clusters;
selecting second cluster centroid locations of the selected second set of clusters;
computing distances pairwise between each pairing of the selected second cluster centroid locations and the composite cluster centroid locations;
selecting an optimum pairing based on a minimum distance of the computed distances; and
updating the composite cluster centroid locations based on the selected second cluster centroid locations and the selected optimum pairing.

23. The computer-readable medium of claim 22, wherein defining the plurality of composite clusters based on the defined plurality of sets of clusters further comprises repeating, for each of the defined plurality of sets of clusters as the selected second set of clusters, the selection of the second cluster centroid locations, the computation of the distances pairwise, the selection of the optimum pairing, and the update of the composite cluster centroid locations.

24. The computer-readable medium of claim 23, wherein defining the plurality of composite clusters based on the defined plurality of sets of clusters further comprises updating cluster assignments for the plurality of observations based on the selected optimum pairing, wherein the update of the cluster assignments is repeated for each of the defined plurality of sets of clusters as the selected second set of clusters.

25. The computer-readable medium of claim 24, wherein defining the plurality of composite clusters based on the defined plurality of sets of clusters further comprises computing a probability of assigning each observation of the plurality of observations to each composite cluster of the composite clusters based on the updated cluster assignments.

26. The computer-readable medium of claim 25, wherein assigning an observation of the plurality of observations to the defined plurality of composite clusters is based on the probability of assigning the observation to each composite cluster.

27. The computer-readable medium of claim 23, wherein, after the repeating for each of the defined plurality of sets of clusters as the selected second set of clusters, assigning the plurality of observations to the defined plurality of composite clusters comprises, for each observation of the plurality of observations:
computing cluster distances between the plurality of data points of an observation and each of the composite cluster centroid locations;
selecting a minimum distance of the computed cluster distances;
selecting a minimum composite cluster associated with the selected minimum distance; and
assigning the observation to the selected minimum composite cluster.

28. The computer-readable medium of claim 23, wherein the computer-readable instructions further cause the computing device to:

store the selected second cluster centroid locations pairwise in association with each composite cluster of the composite clusters based on the selected optimum pairing before the repeating for each of the defined plurality of sets of clusters as the selected second set of clusters;

repeating the storing of the selected second cluster centroid locations for each of the defined plurality of sets of clusters as the selected second set of clusters;

wherein, after the repeating for each of the defined plurality of sets of clusters as the selected second set of clusters, the computer-readable instructions further cause the computing device to:

create noised centroid location data from the stored selected second cluster centroid locations;

train a multi-layer neural network with the created noised centroid location data;

determine a projected centroid location as values of hidden units of a middle layer of the trained multi-layer neural network; and output the determined, projected centroid location in a graph.

29. A computing device comprising:

a processor; and a non-transitory computer-readable medium operably coupled to the processor, the computer-readable medium having computer-readable instructions stored thereon that, when executed by the processor, cause the computing device to receive data that includes a plurality of observations with a plurality of data points defined for each observation, wherein each data point of the plurality of data points is associated with a variable to define a plurality of variables;

repeatedly select a number of clusters into which to segment the received data by repeatedly executing a clustering algorithm with the received data;

define a plurality of sets of clusters based on the repeated execution of the clustering algorithm that resulted in the selected number of clusters;

define a plurality of composite clusters based on the defined plurality of sets of clusters; and assign the plurality of observations to the defined plurality of composite clusters using the plurality of data points defined for each observation.

30. A method of automatically clustering a dataset, the method comprising:

receiving data that includes a plurality of observations with a plurality of data points defined for each observation, wherein each data point of the plurality of data points is associated with a variable to define a plurality of variables;

repeatedly selecting, by a computing device, a number of clusters into which to segment the received data by repeatedly executing a clustering algorithm with the received data;

defining, by the computing device, a plurality of sets of clusters based on the repeated execution of the clustering algorithm that resulted in the selected number of clusters;

defining, by the computing device, a plurality of composite clusters based on the defined plurality of sets of clusters; and assigning, by the computing device, the plurality of observations to the defined plurality of composite clusters using the plurality of data points defined for each observation.

* * * * *